(12) United States Patent
Sutherland et al.

(10) Patent No.: US 11,543,599 B2
(45) Date of Patent: Jan. 3, 2023

(54) FERRULES INCLUDING KEYING FEATURES AND FIBER OPTIC JUNCTIONS INCLUDING THE SAME

(71) Applicant: CORNING RESEARCH & DEVELOPMENT CORPORATION, Corning, NY (US)

(72) Inventors: James Scott Sutherland, Painted Post, NY (US); Thomas Theuerkorn, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/227,605

(22) Filed: Apr. 12, 2021

(65) Prior Publication Data
US 2021/0255402 A1 Aug. 19, 2021

Related U.S. Application Data

(63) Continuation of application No. PCT/US2019/056086, filed on Oct. 14, 2019.

(60) Provisional application No. 62/745,578, filed on Oct. 15, 2018.

(51) Int. Cl.
*G02B 6/38* (2006.01)

(52) U.S. Cl.
CPC ......... *G02B 6/3851* (2013.01); *G02B 6/3831* (2013.01); *G02B 6/3853* (2013.01); *G02B 6/3861* (2013.01); *G02B 6/3874* (2013.01)

(58) Field of Classification Search
None
See application file for complete search history.

(56) References Cited

U.S. PATENT DOCUMENTS

| | | | |
|---|---|---|---|
| 4,898,449 A | 2/1990 | Vroomen et al. | |
| 5,940,561 A | 8/1999 | Dean et al. | |
| 5,980,117 A | 11/1999 | Feuer et al. | |
| (Continued) | | | |

FOREIGN PATENT DOCUMENTS

| | | |
|---|---|---|
| CN | 106873094 A | 6/2017 |
| JP | 5297245 B2 | 9/2013 |
| (Continued) | | |

OTHER PUBLICATIONS

International Search Report and Written Opinion of the International Searching Authority; PCT/US19/056086; dated Dec. 12, 2019; 12 Pages; European Patent Office.

(Continued)

*Primary Examiner* — Jerry Rahll
(74) *Attorney, Agent, or Firm* — Michael E. Carroll, Jr.

(57) ABSTRACT

Fiber optic connectors and junctions between fiber optic connectors include ferrules terminating a plurality of optical fibers, the ferrules having a ferrule keying portion that rotationally aligns and constrains the ferrules with a guide keying portion of an annular guide tube. The ferrules may further aligned and constrained and aligned in a lateral direction with a ferrule sleeve in the junction of connectors. Each of the ferrule sleeve and the guide keying portion individually constrain movement of the ferrules in different dimensions, the guide keying portion rotationally aligning and constraining the ferrules, while allowing freedom of movement in a lateral direction, and the ferrule sleeve aligning and constraining the ferrules in the lateral direction, while allowing rotational freedom of movement.

34 Claims, 19 Drawing Sheets

(56) References Cited

U.S. PATENT DOCUMENTS

| | | |
|---|---|---|
| 9,052,475 B2 | 6/2015 | Rosenberg et al. |
| 9,563,026 B2 | 2/2017 | Hodge |
| 2004/0184739 A1 | 9/2004 | Rondeau et al. |
| 2016/0041344 A1 | 2/2016 | Wasserbauer |

FOREIGN PATENT DOCUMENTS

| | | |
|---|---|---|
| JP | 2016-095432 A | 5/2016 |
| KR | 2001-0001994 A | 1/2001 |
| WO | 2009/030360 A1 | 3/2009 |

OTHER PUBLICATIONS

Joyce et al.; "Alignment of Gaussian Beams"; Applied Optics, vol. 23. No. 23; (1984) pp. 4187-4196.

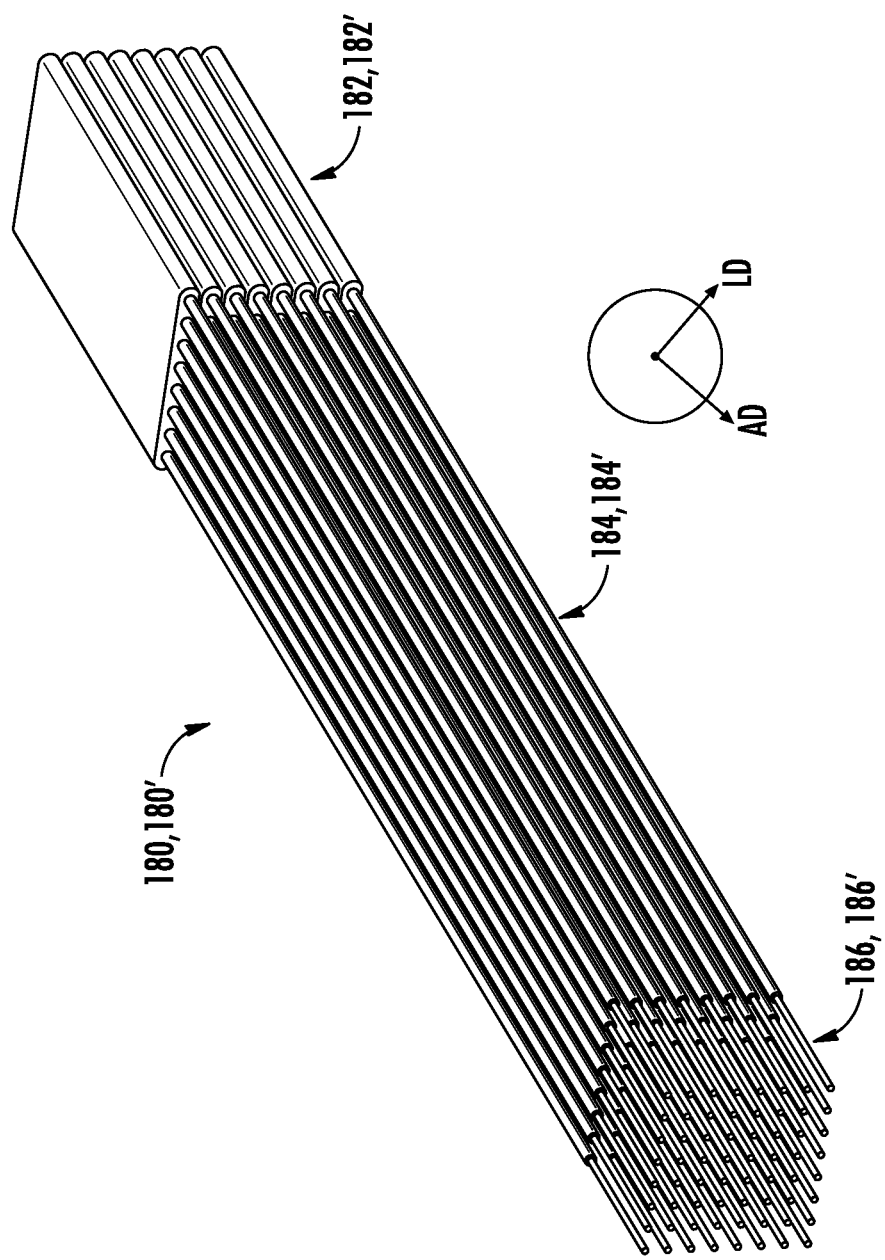
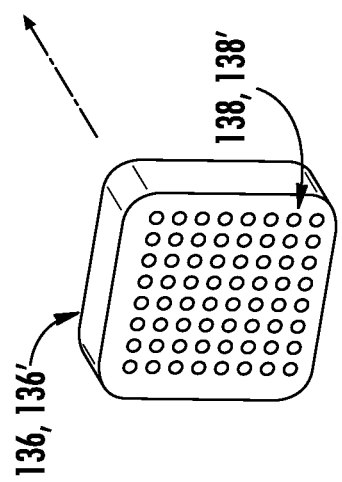
FIG. 11

FERRULES INCLUDING KEYING FEATURES AND FIBER OPTIC JUNCTIONS INCLUDING THE SAME

CROSS REFERENCE TO PRIOR APPLICATIONS

This application is a continuation of International Application No. PCT/US2019/056086 filed Oct. 14, 2019, which claims the benefit of priority to U.S. Application No. 62/745,578, filed on Oct. 15, 2018, both applications being incorporated herein by reference.

BACKGROUND

Field

The present disclosure relates generally relates to fiber optic junctions for connecting multiple optical fibers and ferrules for terminating multiple optical fibers.

Technical Background

Optical fibers are used in an increasing number and variety of applications, such as a wide variety of telecommunications and data transmission applications. The proliferation of optical communications and data transfer has dramatically increased the use of fiber optic connectors including multi-fiber ferrules for simultaneously interconnecting a plurality of optical fibers. Not only are multi-fiber connectors being utilized in greater numbers, but increased performance demands are being placed upon the optical connections between mated connectors. As a result, there is an increased demand in optical communications for what has become generally known as "low-loss, intermateable, multi-fiber connectors." For example, in order to maximize signal transmission between pairs of opposed optical fibers, multi-fiber connectors are required to align each of the optical fibers very precisely, especially for single mode applications. However, as the number of optical fibers in the multi-fiber connector increases so do the challenges in making a connector with suitable performance.

In order to provide the desired alignment, conventional multi-fiber ferrules define a pair of elongate alignment holes that receive and cooperate with respective alignment members, such as guide pins, to accurately align and mate opposing ferrules, and in turn, the align the optical fibers mounted within the multi-fiber ferrules with a high-degree of precision (i.e., on the order of a few microns). However, to achieve the necessary level of precision conventional arrangements including pairs of alignment members create a mechanically overconstrained condition for physical contact of the end faces of the optical fibers. For example, in the case of the alignment members including a pair of high-precision guide pins, a first guide pin may align opposing multi-fiber ferrules in a longitudinal and a lateral directions, leaving the opposing multi-fiber ferrule free to rotate about an axis extending through the first guide pin. The addition of a second guide pin fixes the opposing multifiber ferrules about the axis extending through the first guide pin. However, the second guide pin also restricts movement of the multi-fiber ferrules in the lateral and the longitudinal directions. Because both the first and the second guide pins restrict movement of the multi-fiber ferrules in the lateral and the longitudinal directions, the positioning of the guide pins and corresponding alignment holes must be exceptionally precise, thereby increasing manufacturing costs and decreasing yields. Variations in the positioning of the guide pins and the corresponding alignment holes may result in mechanical interference between the guide pins and the alignment holes, and may increase a mating force required to connect the opposing ferrules for suitably aligning the fiber optic cores and maintain physical contact between the mating optical fibers. Furthermore, mechanical interference between the guide pins and the alignment holes may lead to deformation of the pins and/or the ferrule, which may result in misalignment between the opposing ferrules. Other issues may also arise such as dirt, dust or debris collecting in the alignment holes if multiple mating and de-mating are required.

Accordingly, a need exists for alternative multi-fiber ferrules or connectors that may be connected to one another to form fiber optic junctions.

BRIEF SUMMARY

Fiber optic connectors and fiber optic junctions between fiber optic connectors including multi-fiber ferrules are disclosed. Methods for forming fiber optic junctions are also disclosed herein.

In one embodiment, a fiber optic junction connecting a first plurality of optical fibers to a second plurality of optical fibers, the fiber optic junction including an annular guide tube extending in an axial direction, the annular guide tube defining an inner perimeter and a central axis extending through the annular guide tube in the axial direction, a guide keying portion positioned on the inner perimeter of the annular guide tube, the guide keying portion including at least one ferrule engagement surface extending in a plane that is aligned with the central axis of the annular guide tube, a ferrule positioned at least partially within the annular guide tube and extending between a front end and a rear end positioned opposite the front end, the ferrule defining, a front face that extends in a plane that is transverse to the axial direction and a plurality of fiber alignment holes extending in the axial direction through the front face, an outer surface extending around the ferrule, the outer surface defining a nominal portion, and a ferrule keying portion defined on the outer surface of the ferrule, where the nominal portion is interrupted by the ferrule keying portion and the ferrule keying portion includes at least one keying portion contact surface that extends in a direction or plane that is aligned with the axial direction and the at least one keying portion contact surface is engaged with the at least one ferrule engagement surface of the guide keying portion such that the ferrule is fixed with respect to the annular guide tube about the central axis of the annular guide tube, and a ferrule sleeve positioned between the inner perimeter of the annular guide tube and the outer surface of the ferrule, the ferrule sleeve extending around and engaging at least a portion of the outer surface of the ferrule.

In another embodiment, a fiber optic junction includes an annular guide tube extending in an axial direction, the annular guide tube defining an inner perimeter and a central axis extending through the annular guide tube in the axial direction, a guide keying portion positioned on the inner perimeter of the annular guide tube, the guide keying portion including at least one ferrule engagement surface extending in a direction that is aligned with the central axis of the annular guide tube, a ferrule sleeve positioned within the inner perimeter of the annular guide tube, a first ferrule positioned at least partially within the annular guide tube and extending between a front end and a rear end positioned opposite the front end, the first ferrule defining, an outer surface extending around the first ferrule, the outer surface defining a nominal portion, a ferrule keying portion defined on the outer surface of the first ferrule, where the nominal portion is interrupted by the ferrule keying portion and the ferrule keying portion includes at least one keying portion contact surface that extends in a direction or plane that is aligned with the axial direction and the at least one keying portion contact surface is engaged with the at least one ferrule engagement surface of the guide keying portion such that the first ferrule is fixed with respect to the annular guide tube about the central axis of the annular guide tube, a front face that extends in a plane that is transverse to the axial direction and a plurality of fiber alignment holes extending in the axial direction through the front face, a first plurality of optical fibers extending at least partially through the plurality of fiber alignment holes of the first ferrule, a second ferrule positioned at least partially within the annular guide tube and extending between a front end and a rear end positioned opposite the front end, the second ferrule defining an outer surface extending around the second ferrule, the outer surface defining a nominal portion, a ferrule keying portion defined on the outer surface of the second ferrule, where the nominal portion is interrupted by the ferrule keying portion and the ferrule keying portion includes at least one keying portion contact surface that extends in a direction or plane that is aligned with the axial direction and the at least one keying portion contact surface is engaged with the at least one ferrule engagement surface of the guide keying portion such that the second ferrule is fixed with respect to the annular guide tube about the central axis of the annular guide tube, a front face that extends in a plane that is transverse to the axial direction and a plurality of fiber alignment holes extending in the axial direction through the front face, a second plurality of optical fibers extending at least partially through the plurality of fiber alignment holes of the second ferrule, where the second plurality of optical fibers are optically coupled to the first plurality of optical fibers.

In yet another embodiment, a method for forming a fiber optic junction includes inserting a plurality of optical fibers into a plurality of fiber alignment holes of a fiber array substrate, applying an adhesive to the plurality of optical fibers to couple the plurality of optical fibers to the fiber array substrate, inserting the plurality of optical fibers and the fiber array substrate into a guide cavity defined by a ferrule, the ferrule further defining the ferrule defining an outer surface extending around the ferrule, the outer surface defining a nominal portion and a ferrule keying portion defined on the outer surface of the ferrule, where the nominal portion is interrupted by the ferrule keying portion, coupling the plurality of optical fibers and the fiber array substrate to the ferrule, inserting the ferrule into an annular guide tube extending in an axial direction, the annular guide tube defining an inner perimeter and a central axis extending through the annular guide tube in the axial direction, and engaging the ferrule keying portion with a guide keying portion positioned on the inner perimeter of the annular guide tube.

Still other embodiments of the disclosure are directed to fiber optic connectors. The fiber optic connector may comprise a ferrule, a fiber array substrate, and a lens array. The ferrule extends between a front end and a rear end positioned opposite the front end. The ferrule defines a guide cavity, an outer surface extending around the ferrule with the outer surface defining a nominal portion, and a ferrule keying portion. The ferrule keying portion defined on the outer surface of the ferrule, wherein the nominal portion is interrupted by the ferrule keying portion and the ferrule keying portion comprises at least one keying portion contact surface that extends in a plane that is aligned with an axial direction of the ferrule. The fiber array substrate comprises a plurality of fiber alignment holes that extend to a front face of the fiber array substrate, wherein a portion of the fiber array substrate is disposed within the guide cavity of the ferrule. The lens array comprises a plurality of fiber lead-ins aligned with a plurality of lenses. In some embodiments, the lens array may have one or more material characteristics that are matched to the fiber array substrate.

Yet other embodiments are directed to fiber optic connectors comprising a ferrule and a lens array. The ferrule extends between a front end and a rear end positioned opposite the front end. The ferrule defines a plurality of fiber alignment holes that extend to a front end of the ferrule, an outer surface extending around the ferrule with the outer surface defining a nominal portion, and a ferrule keying portion. The ferrule keying portion defined on the outer surface of the ferrule, wherein the nominal portion is interrupted by the ferrule keying portion and the ferrule keying portion comprises at least one keying portion contact surface that extends in a plane that is aligned with an axial direction of the ferrule. The lens array comprises a plurality of fiber lead-ins aligned with a plurality of lenses. The lens array comprises a first material having a first coefficient of thermal expansion (CTE) and the ferrule comprises a second material having a second coefficient of thermal expansion, wherein the first CTE is matched to the second CTE to within 2 ppm/° C. from 0° Celsius to 40° Celsius.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 11 schematically depicts a plurality of optical fibers being inserted to a fiber array substrate, according to one or more embodiments shown and described herein;

DETAILED DESCRIPTION

Embodiments described herein generally relate to various devices for forming an optical connection between optical fibers. More particularly, embodiments described herein are directed to fiber optic junctions according to the present disclosure include ferrules having a ferrule keying portion that rotationally aligns and constrains the ferrules with a guide keying portion of an annular guide tube. The ferrules are further aligned and constrained and aligned in a lateral direction with a ferrule sleeve. Each of the ferrule sleeve and the guide keying portion individually constrain movement of the ferrules in a single dimension. By each individually restricting movement of the ferrules in single and in separate dimensions, the ferrule sleeve and the guide keying portion may restrain the ferrules as desired, without mechanically overconstraining the ferrules. Furthermore as the ferrules are aligned and constrained using a common ferrule sleeve and common guide keying portion, the components used to optically couple the ferrules may be minimized, thereby reducing tolerance stack-ups and improving alignment between the ferrules. These and other embodiments are described in greater detail below with reference to the appended figures.

As used herein, the term "axial direction" refers to a forward-rearward direction along an axis extending through components of a fiber optic junction and is depicted as "AD" in the appended figures. The term "lateral direction" refers to an inward-outward direction from the axis extending through the components of the fiber optic junction and is transverse to the axial direction and is depicted as "LD" in the appended figures.

Figure 1:
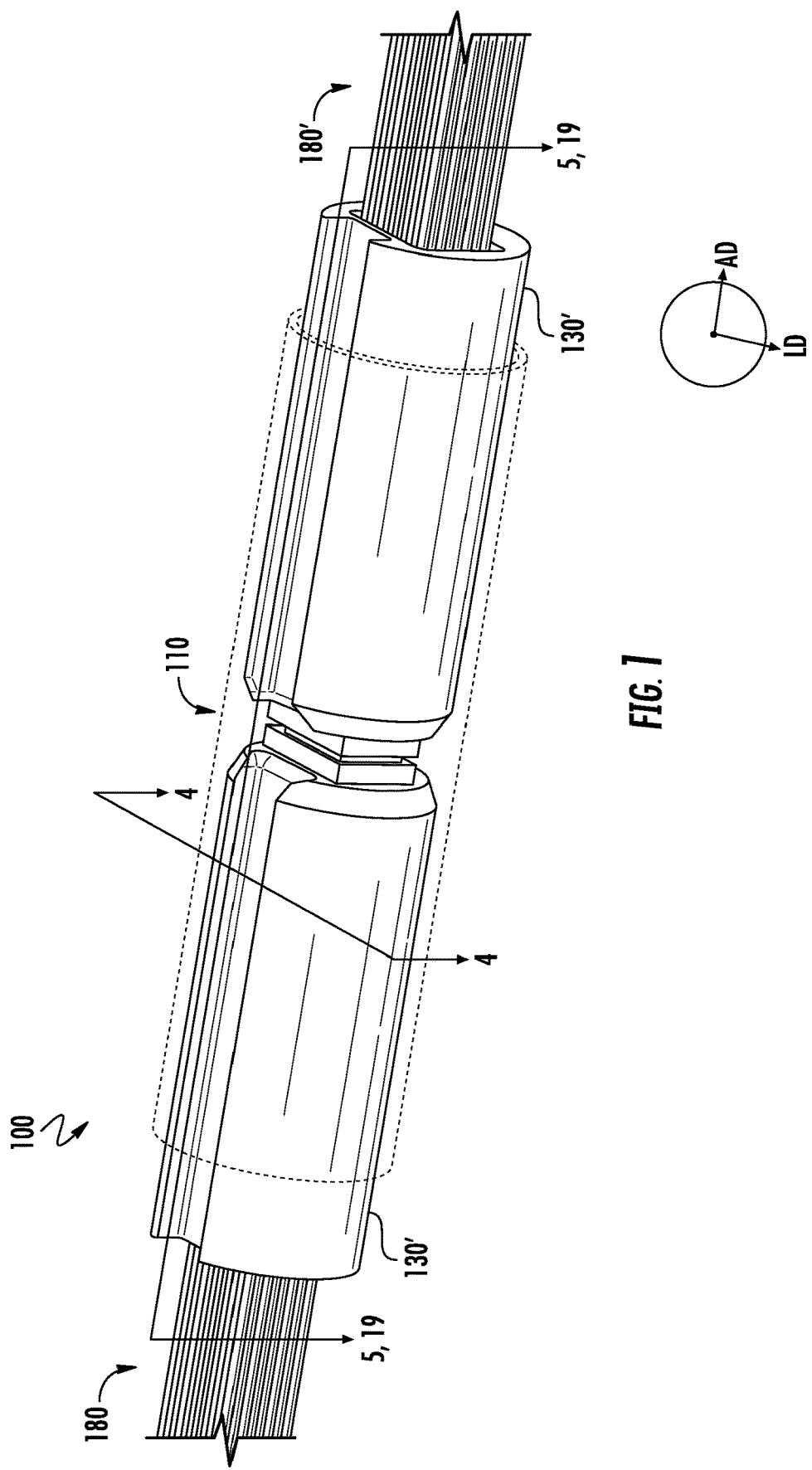
FIG. 1 schematically depicts a perspective view of a fiber optic junction, according to one or more embodiments shown and described herein.

Referring initially to FIG. 1, a perspective view of a fiber optic junction 100 is schematically depicted. The fiber optic junction 100 comprises a first multifiber connector 10, and a second multifiber 10' as shown. The fiber optic junction 100 generally includes an annular guide tube 110, a first plurality of optical fibers 180 terminating at a first ferrule 130, and a second plurality of optical fibers 180' terminating a second ferrule 130'. The first plurality of optical fibers 180 and the second plurality of optical fibers 180' are optically coupled to one another at the fiber optic junction 100, as described in greater detail herein.

Figure 2:
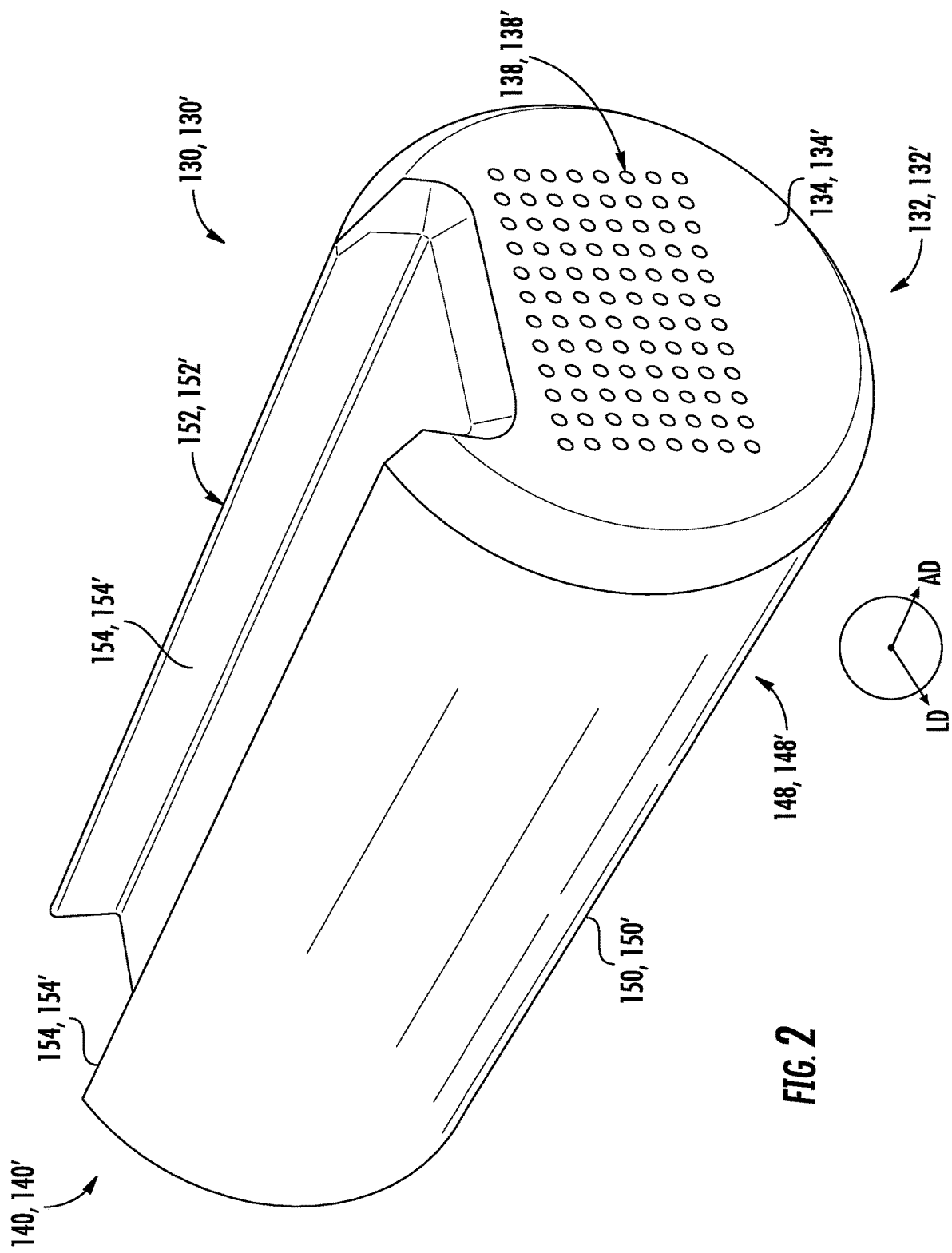
FIG. 2 schematically depicts a ferrule of the fiber optic junction of FIG. 1 including a ferrule keying portion, according to one or more embodiments shown and described herein.

Referring to FIG. 2, a perspective view of the first ferrule 130 and the second ferrule 130' is schematically depicted for the respective multifiber connectors 10,10'. In embodiments, the second ferrule 130' is substantially the same to the first ferrule 130 and includes the same features. The ferrules 130, 130' generally extend between a front end 132, 132' and a rear end 140, 140' in the axial direction and include an outer surface 148, 148' extending around a perimeter of the ferrules 130, 130'. In embodiments, at least a portion of the outer surface 148, 148' includes a curved surface, and in the embodiment depicted in FIG. 2, the outer surface 148, 148' of the ferrules 130, 130' generally define a circular cross-section. In other embodiments, the outer surface 148, 148' may include one or more planar surfaces, as described in greater detail herein.

The outer surface 148, 148' of the ferrules 130, 130' generally includes a nominal portion 150, 150' that is interrupted by a ferrule keying portion 152, 152'. The nominal portion 150, 150' is referenced herein as being "nominal" to help distinguish it from the various distinctive surface features that are defined ferrules 130, 130'. Without these distinctive surface features, the nominal portion 150, 150' would form a relatively uniform and continuous surface of the ferrules 130, 130'. Reference herein to a surface feature, e.g., a keying portion, that is "defined on" the outer surface 148, 148' of the ferrules 130, 130' contemplates that the surface feature may be a subtractive surface feature, like a cut-out forming a female keyway, or an additive surface feature, like a projection forming a male key.

In the embodiment depicted in FIG. 2, the ferrules 130, 130' include a ferrule keying portion 152, 152' that interrupts the nominal portion 150, 150' of the outer surface 148, 148'. The ferrule keying portion 152, 152' generally includes at least one keying portion contact surface 154, 154' that extends in a plane or direction that is aligned with an axial direction. In the embodiment depicted in FIG. 2, the ferrule keying portion 152, 152' is formed as a recessed cut-out extending inward from the nominal portion 150, 150' and includes a pair of opposing keying portion contact surfaces 154, 154' that are oriented to face one another and both extend in directions or planes that are aligned with the axial direction, thereby forming a female keyway. In other embodiments, the ferrule keying portion 152, 152' may be formed as a projection extending outward from the nominal portion 150, 150', as described in greater detail herein.

The ferrules 130, 130' generally include a front face 134, 134' positioned at the front end 132, 132' of the ferrules 130, 130', the front face 134, 134' extending in a plane that is transverse to the axial direction. The front face 134, 134' generally defines a plurality of fiber alignment holes 138, 138' extending into the ferrules 130, 130' from the front face 134, 134'. Each of the plurality of fiber alignment holes 138, 138' are structurally configured to receive individual fibers of the plurality of optical fibers 180, 180' (FIG. 1), as described in greater detail herein.

Figure 3:
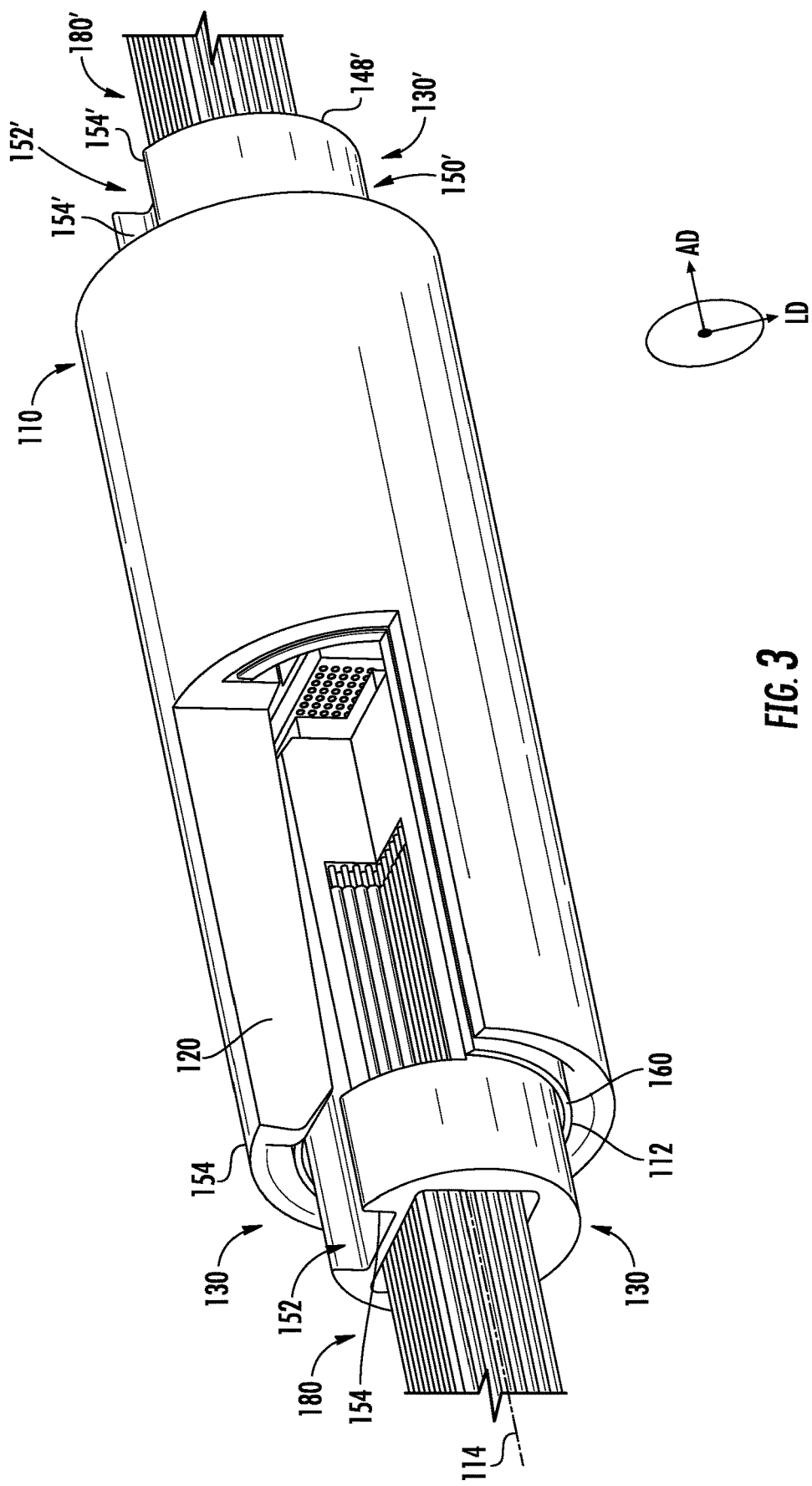
FIG. 3 schematically depicts the ferrule of FIG. 2 inserted within an annular guide tube, according to one or more embodiments shown and described herein.
Figure 4:
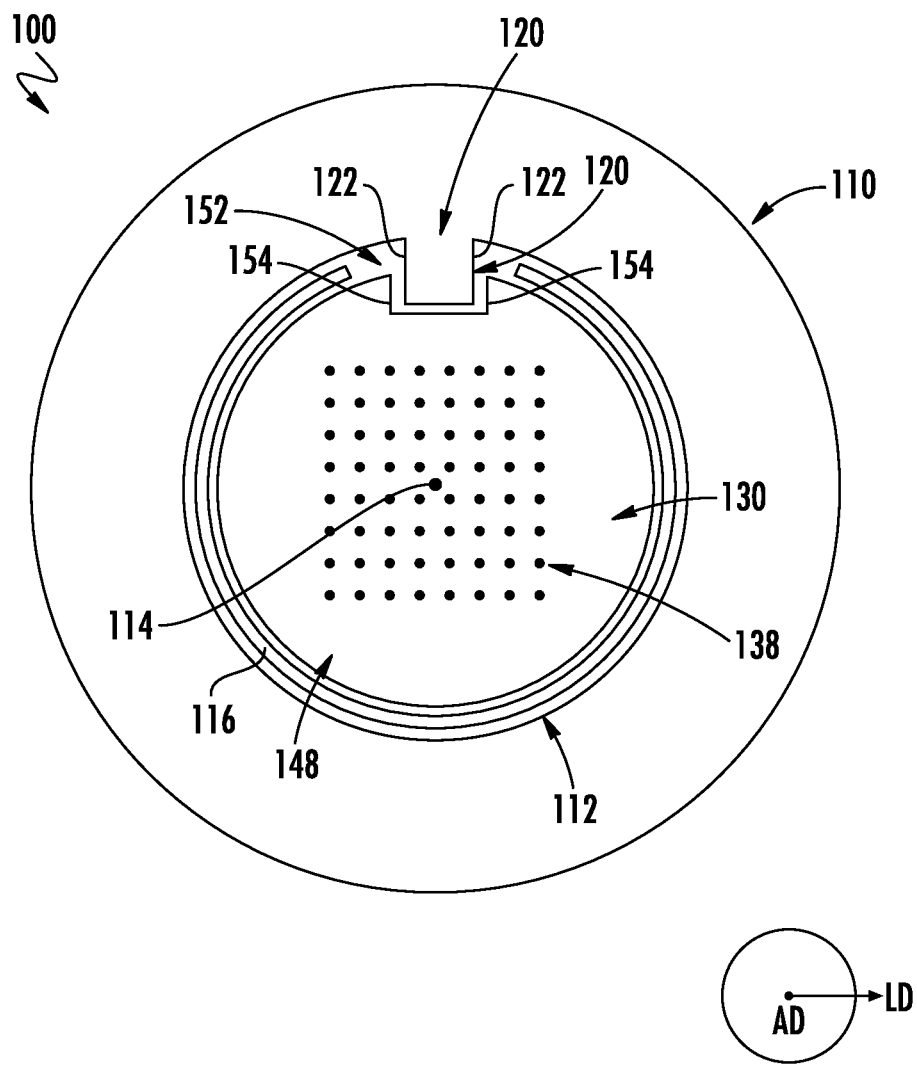
FIG. 4 schematically depicts a cross-section of the ferrule within the annular guide tube along section 4-4 of FIG. 1, according to one or more embodiments shown and described herein.

Referring collectively to FIGS. 3 and 4, a partial section view of the fiber optic junction 100 and a section view of the fiber optic junction along section 4-4 of FIG. 1 are schematically depicted, respectively. The annular guide tube 110 generally defines an inner perimeter 112, and the first ferrule 130 is positioned within the inner perimeter 112 of the annular guide tube 110, such that at least a portion of the outer surface 148 of the first ferrule 130' is circumscribed by the inner perimeter 112 of the annular guide tube 110. Similarly, the second ferrule 130' is positioned within the inner perimeter 112 of the annular guide tube 110 such that at least a portion of the outer surface 148' of the second ferrule 130' is circumscribed by the inner perimeter 112 of the annular guide tube 110.

In embodiments, the fiber optic junction 100 includes a ferrule sleeve 160. The ferrule sleeve 160 is positioned within the inner perimeter 112 of the annular guide tube 110, between the inner perimeter 112 of the annular guide tube 110 and the outer surface 148 of the first ferrule 130, and between the inner perimeter 112 of the annular guide tube 110 and the outer surface 148' of the second ferrule 130'. In embodiments, the ferrule sleeve 160 generally defines a c-shaped cross-section such that the ferrule sleeve 160 extends around the nominal portions 150, 150' (FIG. 2) of the first ferrule 130 and the second ferrule 130', respectively, leaving the ferrule keying portions 152, 152' of the first ferrule 130 and the second ferrule 130' uncovered by the ferrule sleeve 160. Because the c-shaped cross-section leaves the ferrule keying portions 152, 152' uncovered, the ferrule keying portions 152, 152' may be accessed, such as by a guide keying portion 120, as described in greater detail herein. In the embodiment depicted in FIGS. 3 and 4, the ferrule sleeve 160 is spaced apart from the ferrule keying portions 152, 152' of the first ferrule 130 and the second ferrule 130'. The ferrule sleeve 160 engages the nominal portions 150, 150' of the outer surfaces 148, 148' of the first ferrule 130 and the second ferrule 130', respectively. The ferrule sleeve 160 restricts movement of the first ferrule 130 and the second ferrule 130' with respect to one another in the lateral direction and generally aligns the first ferrule 130 and the second ferrule 130' with one another in the lateral direction. The ferrule sleeve 160 may generally permit movement of the first ferrule 130 and the second ferrule 130' in the axial direction such that the first ferrule 130 and the second ferrule 130' may be insertable within the ferrule sleeve 160 from opposite ends. Furthermore, because the ferrule sleeve 160 is spaced apart from the ferrule keying portions 152, 152' of the first ferrule 130 and the second ferrule 130', the ferrule sleeve 160 may allow rotation of the first ferrule 130 and the second ferrule 130' with respect to one another about the axial direction.

Accordingly, the ferrule sleeve 160 constrains movement of the first ferrule 130 and the second ferrule 130' with respect to one another in a single dimension (i.e., in the lateral direction), while allowing the first ferrule 130 and the second ferrule 130' freedom in other dimensions (i.e., in the axial direction and rotationally about the axial direction).

The fiber optic junction 100 further includes a guide keying portion 120 positioned on the inner perimeter 112 of the annular guide tube 110. In the embodiment depicted in FIGS. 3 and 4, the guide keying portion 120 extends inward from the inner perimeter 112 of the annular guide tube 110 and includes at least one ferrule engagement surface 122 that extends in a direction that is aligned with a central axis 114 extending through the annular guide tube 110 in the axial direction. The guide keying portion 120 may be integral with annular guide tube 110 in some embodiments. In other embodiments, the guide keying portion 120 may be coupled to the inner perimeter 112 of the annular guide tube 110. In embodiments, the guide keying portion 120 includes two opposing ferrule engagement surfaces 122 that each extend in a direction or plane that is aligned with the central axis 114 of the annular guide tube as shown. The at least one ferrule engagement surface 122 of the guide keying portion 120 is structurally configured to engage the at least one keying portion contact surface 154 of the first ferrule 130 and the second ferrule 130'. Engagement between the at least one ferrule engagement surface 122 of the guide keying portion 120 and the at least one keying portion contact surface 154 of the first ferrule 130 inhibits rotation of the first ferrule 130 about the central axis 114 with respect to the annular guide tube 110. Similarly, engagement between the at least one ferrule engagement surface 122 of the guide keying portion 120 and the at least one keying portion contact surface 154' of the second ferrule 130' inhibits rotation of the second ferrule 130' about the central axis 114 with respect to the annular guide tube 110. Because both the at least one keying portion contact surface 154 of the first ferrule 130 and the at least one keying portion contact surface 154' of the second ferrule 130' engage the same at least one at least one ferrule engagement surface 122 of the guide keying portion 120, the at least one ferrule engagement surface 122 of the guide keying portion 120 inhibits rotation of the first ferrule 130 with respect to the second ferrule 130' about the central axis 114 of the annular guide tube 110. Engagement of the at least one ferrule engagement surface 122 of the guide keying portion 120 with the at least one keying portion contact surface 154 of the first ferrule 130 and the at least one keying portion contact surface 154' of the second ferrule 130' further serves to angularly align the first ferrule 130 with the second ferrule 130' about the central axis 114 of the annular guide tube 110.

While the guide keying portion 120 inhibits rotation of the first ferrule 130 with respect to the second ferrule 130' about the central axis 114 of the annular guide tube 110, the guide keying portion 120 permits movement of the first ferrule 130 and the second ferrule 130' in the axial direction such that the first ferrule 130 and the second ferrule 130' are insertable to the annular guide tube 110. Furthermore, the guide keying portion 120 permits movement of the first ferrule 130 and the second ferrule in the lateral direction, for example, in the lateral direction downward from the guide keying portion 120. Accordingly, guide keying portion 102 constrains movement of the first ferrule 130 and the second ferrule 130' with respect to one another in a single dimension (i.e., rotationally about the axial direction), while allowing the first ferrule 130 and the second ferrule 130' freedom in other dimensions (i.e., in the axial direction and the lateral direction).

As such, movement of the first ferrule 130 with respect to the second ferrule 130' in the lateral direction is constrained by the ferrule sleeve 160, and movement of the first ferrule 130 with respect to the second ferrule 130' rotationally about the axial direction is constrained by the guide keying portion 120. However, each of the ferrule sleeve 160 and the guide keying portion 120 each individually constrain movement of the first ferrule 130 and the second ferrule 130' in a single dimension. For example, because the guide keying portion 120 is positioned on the annular guide tube 110 and is separate from the ferrule sleeve 130, the first ferrule 130 and the second ferrule 130' may be generally rotatable within the ferrule sleeve 130 about the axial direction. Similarly, because the guide keying portion 120 is positioned on the annular guide tube 110 and is separate from the ferrule sleeve 130, the guide keying portion 120 may allow the first ferrule 130 and the second ferrule 130' to move in the lateral direction. By each individually restricting movement of the first ferrule 130 and the second ferrule 130' in single and in separate dimensions, the ferrule sleeve 160 and the guide keying portion 120 may restrain the first ferrule 130 with respect to the second ferrule 130' as desired, without mechanically overconstraining the first ferrule 130 with respect to the second ferrule 130'.

For example and without being bound by theory, in some conventional fiber optic junctions, opposing ferrules may be engaged with one another and may be aligned with one another using a pair of guide pins. Each of the guide pins may restrict movement of the opposing ferrules in the lateral direction and in a longitudinal direction, such that each of the guide pins simultaneously restrict movement of the opposing ferrules in the same dimensions (i.e., in the lateral and in the longitudinal direction). By simultaneously restricting movement of the opposing ferrules in the same dimensions, conventional guide pins mechanically overconstraining the fiber optic junction. As a result of both of the guide pins individually restricting movement of the ferrules in lateral and the longitudinal directions, the positioning of the guide pins and corresponding alignment holes must be exceptionally precise, thereby increasing manufacturing costs. Variations in the positioning of the guide pins and the corresponding alignment holes may result in mechanical interference between the guide pins and the alignment holes, and may increase a mating force required to connect the opposing ferrules. Furthermore, mechanical interference between the guide pins and the alignment holes may lead to deformation of the pins and/or the opposing ferrules, which may result in misalignment between the opposing ferrules. By contrast, the ferrule sleeve 160 and the guide keying portion 120 of the present disclosure each constrain movement of the first ferrule 130 and the second ferrule 130' in individual and separate dimensions, such that the fiber optic junction 100 is not mechanically overconstrained.

Furthermore, by connecting the first ferrule 130 and the second ferrule 130' via a common ferrule sleeve 160 and guide keying portion 120 engaged with both the first ferrule 130 and the second ferrule 130', tolerance stack-ups between the first ferrule 130 and the second ferrule 130' may be reduced as compared to conventional fiber optic junctions. For example, conventional fiber optic junctions may include individual housings coupled to each of the opposing ferrules, and the individual housings may be coupled to one another to optically couple the opposing ferrules to one another. By contrast, the first ferrule 130 and the second ferrule 130' of the present application are aligned with one another by a common ferrule sleeve 160 and guide keying portion 120, reducing the number of components interfacing with one another to align the first ferrule 130 with the second ferrule 130' as compared to conventional configurations. By reducing tolerance stack-ups between the first ferrule 130 and the second ferrule 130', alignment between the first plurality of optical fibers 180 and the second plurality of optical fibers 180' via the first ferrule 130 and the second ferrule 130' may be improved.

Figure 5:
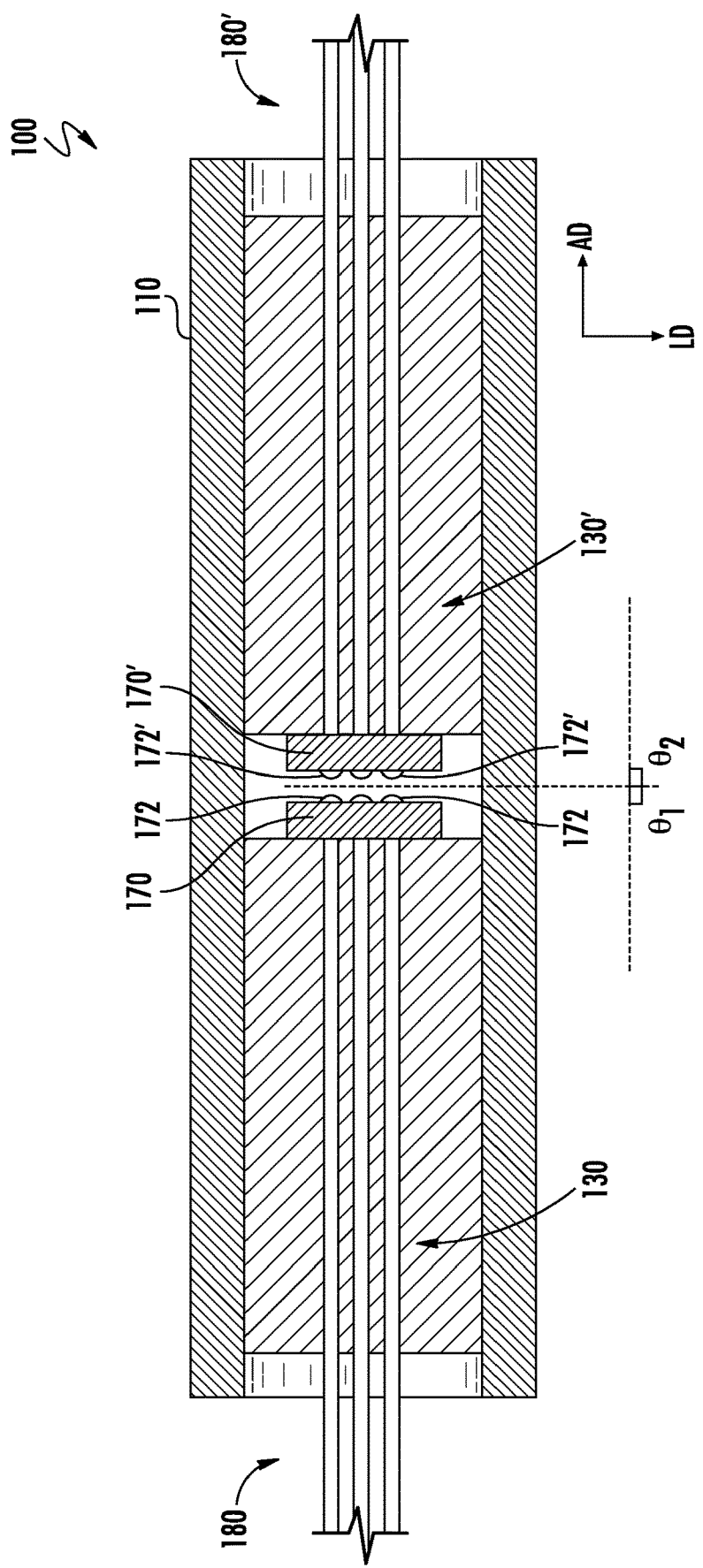
FIG. 5 schematically depicts a cross-section of the fiber optic junction of FIG. 1 along section 5-5 of FIG. 1, according to one or more embodiments shown and described herein.

Referring to FIG. 5, a section view of the fiber optic junction is depicted along section 5-5 of FIG. 1. With the first ferrule 130 and the second ferrule 130' inserted into the annular guide tube 110, the first plurality of optical fibers 180 are optically coupled to the second plurality of optical fibers 180'. In the embodiment depicted in FIG. 5, the first plurality of optical fibers 180 are optically coupled to the second plurality of optical fibers 180' through an expanded beam lens connection. In particular, the fiber optic junction 100 includes a first lens array 170 including a first plurality of lenses 172 that are each optically coupled to and associated with one of the first plurality of optical fibers 180. Similarly, a second lens array 170' including a second plurality of lenses 172' are each optically coupled to and associated with one of the second plurality of optical fibers 180'. The first lens array 170 is optically coupled to the second lens array 170', such that the first plurality of optical fibers 180 is optically coupled to the second plurality of optical fibers 180' through the first lens array 170 and the second lens array 170'. The use of an expanded beam lens connection between the first plurality of optical fibers 180 and the second plurality of optical fibers 180' may reduce signal loss between the first plurality of optical fibers 180 and the second plurality of optical fibers 180' resulting from misalignment in the lateral direction.

In embodiments the first lens array 170 and the second lens array 170' may be formed through any suitable process, including without limitation a photolithography process as described in U.S. Pat. No. 7,241,559, assigned to Corning Inc., the contents of which are hereby incorporated by reference in its entirety. In some embodiments an antireflective film may optionally be positioned on the first lens array 170 and the second lens array 170' to reduce reflection loss between the first lens array 170 and the second lens array 170'. While the embodiment depicted in FIG. 5 schematically depicts a first lens array 170 and a second lens array 170' that optically couple the first plurality of optical fibers 180 to the second plurality of optical fibers 180'. However, the fiber optic junction 100 may optically couple the first plurality of optical fibers 180 to the second plurality of optical fibers 180' in any suitable manner, such as by direct contact between optical fibers, or the like.

Figure 6:
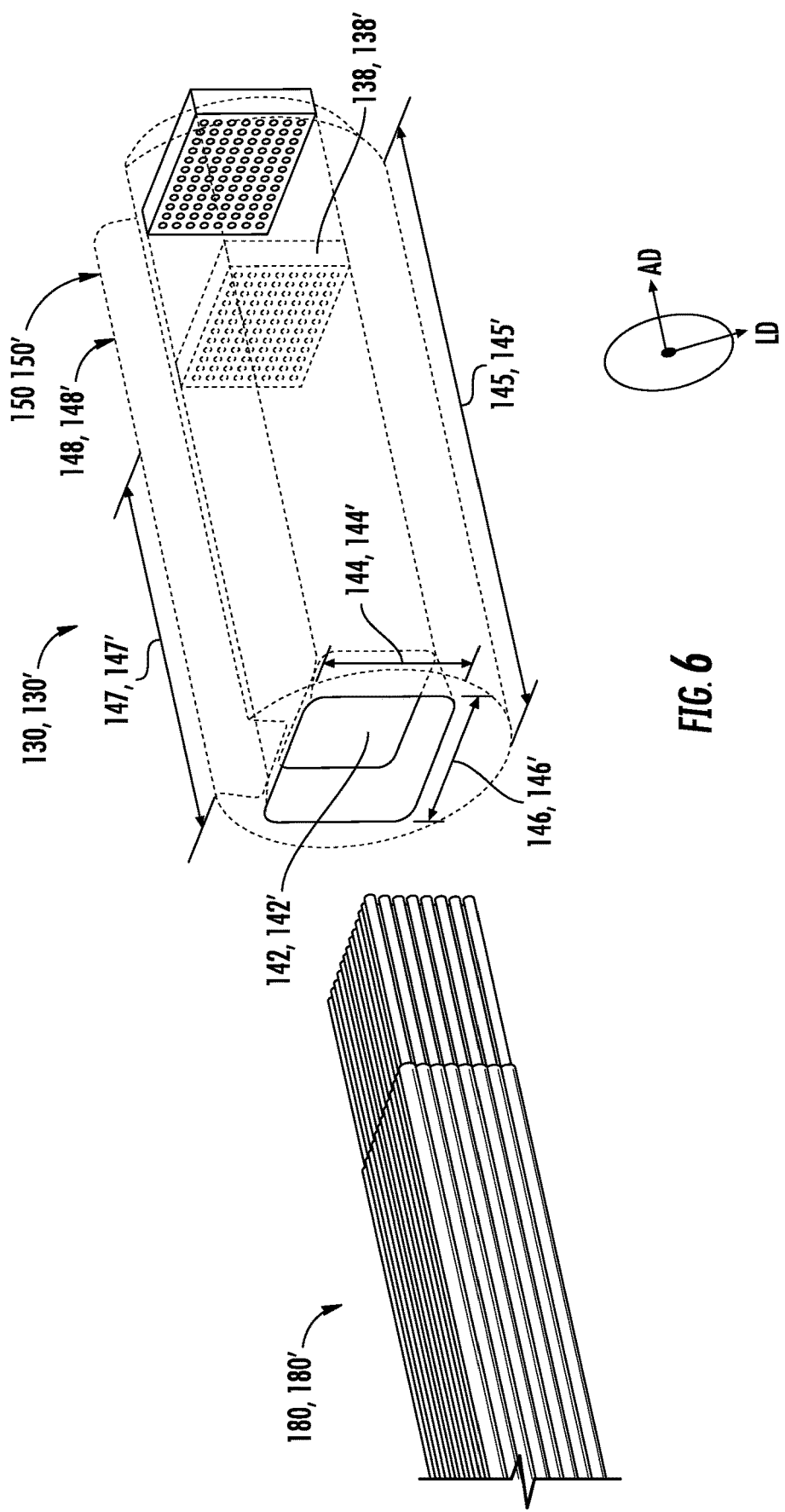
FIG. 6 schematically depicts a rear perspective exploded view of a plurality of optical fibers and the ferrule of the fiber optic junction of FIG. 5, according to one or more embodiments shown and described herein.

Referring to FIG. 6, a rear perspective exploded view of the first ferrule 130 and the first plurality of optical fibers 180, and the second ferrule 130' and the second plurality of optical fibers 180' is schematically depicted. It should be understood that the second ferrule 130' and the second plurality of optical fibers 180' are substantially the same as the first ferrule 130 and the first plurality of optical fibers 180, and each include the same features. The ferrules 130, 130' generally defines a guide cavity 142, 142' extending into the rear end 140, 140' of the ferrules 130, 130' in the axial direction, the guide cavity 142, 142' including a guide cavity height 144, 144' and a guide cavity width 146, 146'. The guide cavity height 144, 144' and the guide cavity width 146, 146' are generally selected to correspond with a height and width of the plurality of optical fibers 180, 180'.

In embodiments, the guide cavity 142, 142' extends into the rear end 140, 140' of the ferrules 130, 130' in the axial direction a distance 147, 147' that is greater than both the guide cavity height 144, 144' and the guide cavity width 146, 146'. By extending into the rear end 140, 140' the distance 147, 147' that is greater than the than both the guide cavity height 144, 144' and the guide cavity width 146, 146', the guide cavity 142, 142' may assist in aligning individual fibers of the plurality of optical fibers 180, 180' with the plurality of fiber alignment holes 138, 138'. Furthermore, by extending into the rear end 140, 140' the distance 147, 147' that is greater than the than both the guide cavity height 144, 144' and the guide cavity width 146, 146', the guide cavity 142, 142' may assist in isolating forces in the lateral direction applied to the plurality of optical fibers 180, 180' from the fiber alignment holes 138, 138', which may assist in maintaining alignment of the plurality of optical fibers 180, 180'.

The ferrules 130, 130' further include a length 145, 145' evaluated in the axial direction that is at least twice a diameter or major dimension for non-round ferrule geometries of the cross-section of the ferrules 130, 130'. The diameter means the diameter across the primitive geometry of the ferrule (i.e., the round cross-section and not through the keying portion) and the major dimension is the largest dimension across the primitive geometry of the ferrules. By extending a length 145, 145' that is at least twice a diameter or major dimension of the ferrules 130, 130', binding of the ferrules 130, 130' when inserted into the annular guide tube 110 (FIG. 1) may be reduced. Furthermore, by extending a length 145, 145' that is at least twice the diameter or major dimension of the ferrules 130, 130', angular misalignment between the first ferule 130 and the second ferrule 130' when inserted into the annular guide tube 110 (FIG. 1) may be reduced.

For example and as best shown in FIG. 5, the first ferrule 130 and the second ferrule 130' are each oriented such that the first plurality of optical fibers 180 and the second plurality of optical fibers 180' are aligned with one another, and are each oriented such that a line extending from the first plurality of optical fibers 180 and the second plurality of optical fibers 180' would intersect a plane extending in the lateral direction between the first plurality of optical fibers 180 and the second plurality of optical fibers 180' at angles $\theta_1$ and $\theta_2$, respectively. In the arrangement depicted in FIG. 5, angles $\theta_1$ and $\theta_2$ are each right angles (i.e., the first plurality of optical fibers 180 and the second plurality of optical fibers 180' are each oriented in a direction orthogonal to the depicted plane). However, in the case of misalignment of one or both of the first plurality of optical fibers 180 and the second plurality of optical fibers 180', such as may result from misalignment of the first ferrule 130 and/or the second ferrule 130' in the lateral direction, the angles $\theta_1$ and $\theta_2$ may intersect the plane at an angle other than a right angle. However, and without being bound by theory, by increasing the length 145, 145' of the first ferrule 130 and the second ferrule 130', the angles $\theta_1$ and $\theta_2$ may be closer to perpendicular as compared to shorter ferrules with a similar misalignment in the lateral direction (e.g., as a result of the Pythagorean theorem). In this manner, by increasing the length 145, 145' of the first ferrule 130 and the second ferrule 130', angular misalignment between the first ferrule 130 and the second ferrule 130' may be minimized.

Figure 7:
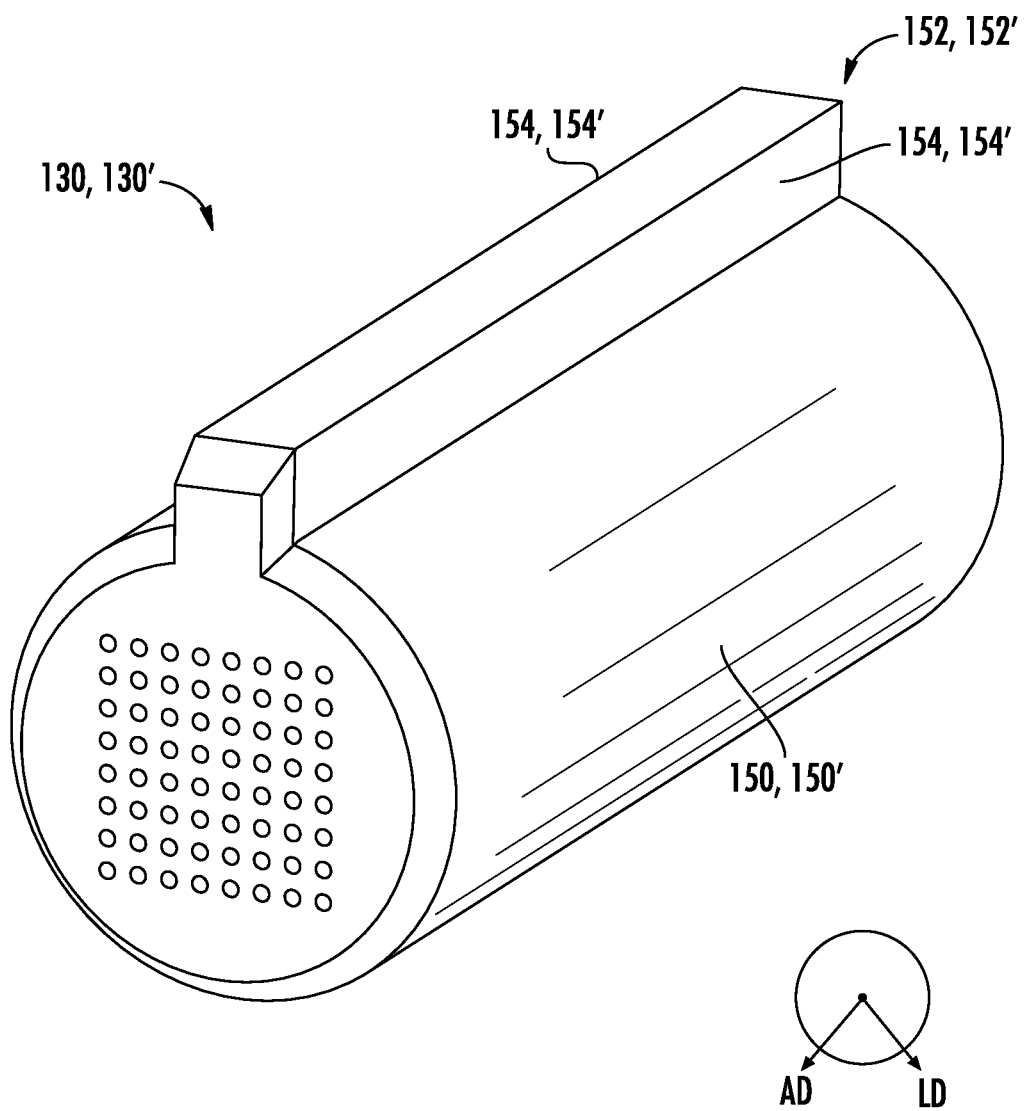
FIG. 7 schematically depicts a perspective view of another ferrule including another ferrule keying portion, according to one or more embodiment shown and described herein.

Referring to FIG. 7, another embodiment of the first ferrule 130 and the second ferrule 130' is schematically depicted. In the embodiment depicted in FIG. 7, the ferrules 130, 130' include a ferrule keying portion 152, 152' that extends outward from the nominal portion 150, 150'. In particular, the ferrule keying portion 152, 152' includes at least one keying portion contact surface 154, 154' extending outward from the nominal portion 150, 150'. The ferrules 130, 130' depicted in FIG. 7 are structurally configured to be used with an annular guide tube 110 (FIG. 1) including a guide keying portion 120 (FIG. 4) that extends inward into the inner perimeter 112 (FIG. 4) of the annular guide tube 110 (FIG. 1). Similar to the embodiment described above with respect to FIGS. 1-6, engagement between the guide keying portion 120 (FIG. 4) and the ferrule keying portion 152, 152' restricts rotation of the ferrules 130, 130' with respect to one another about the axial direction.

Figure 8:
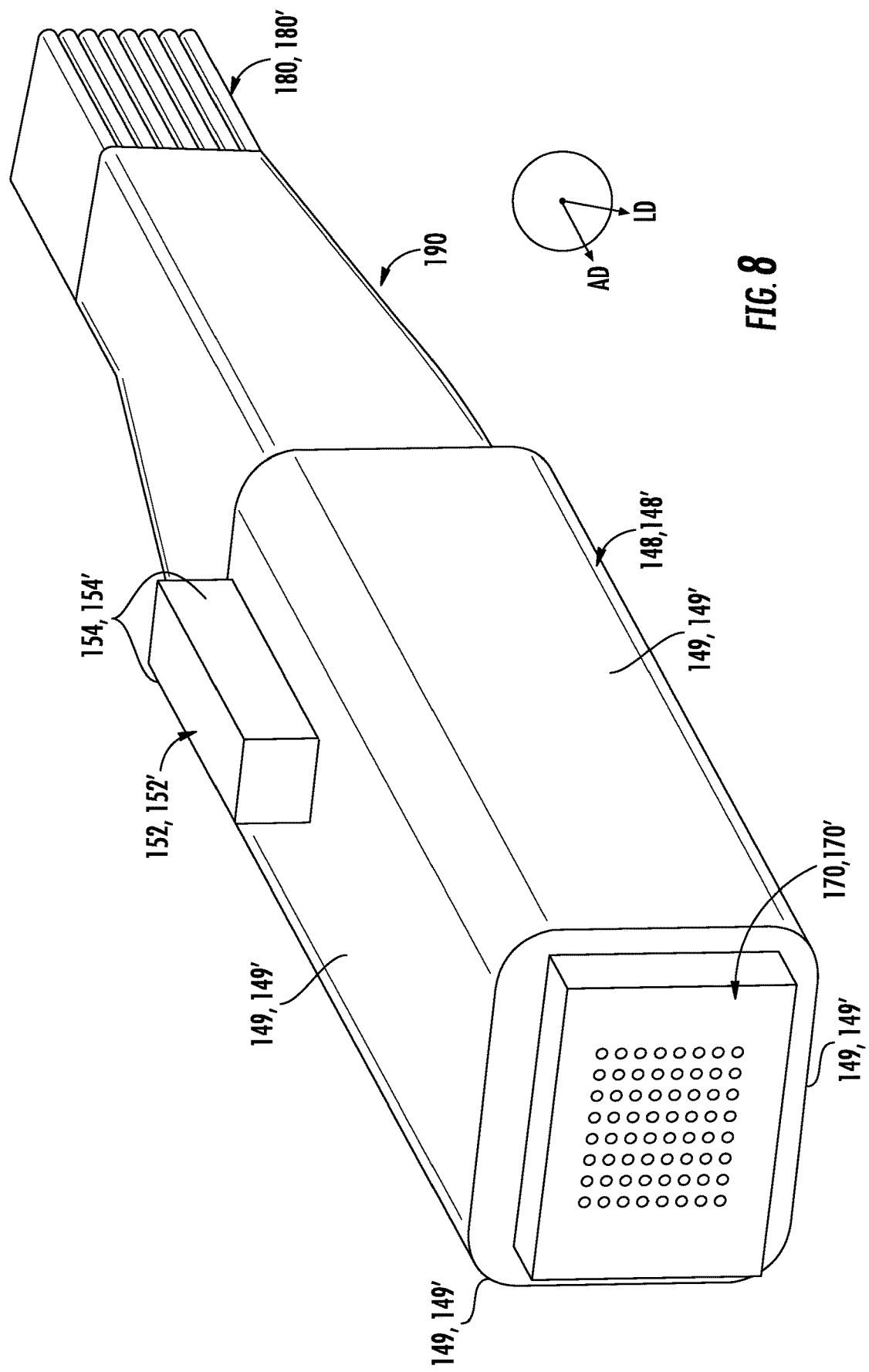
FIG. 8 schematically depicts a plurality of optical fibers positioned within another ferrule, according to one or more embodiments shown and described herein.
Figure 9:
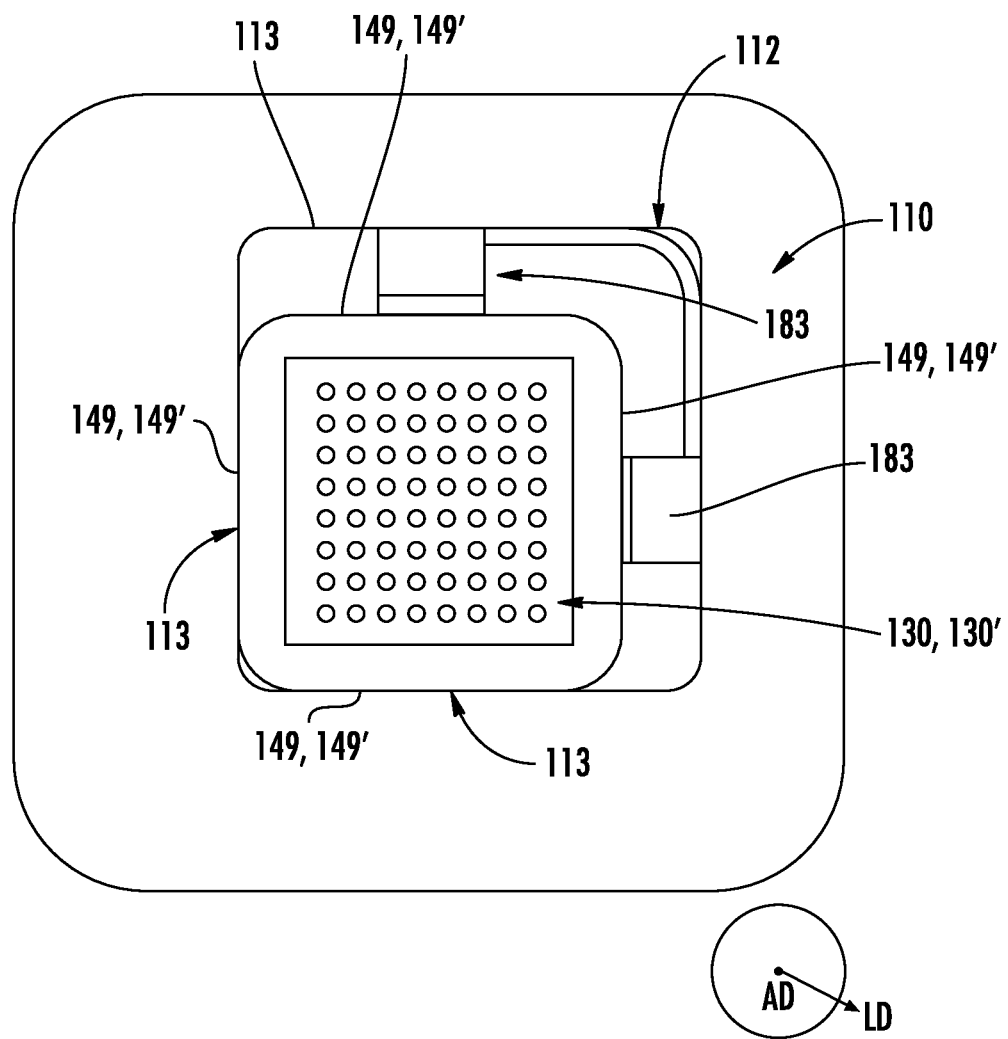
FIG. 9 schematically depicts a cross-section of the ferrule of FIG. 8 positioned within an annular guide tube, according to one or more embodiments shown and described herein.
Figure 10:
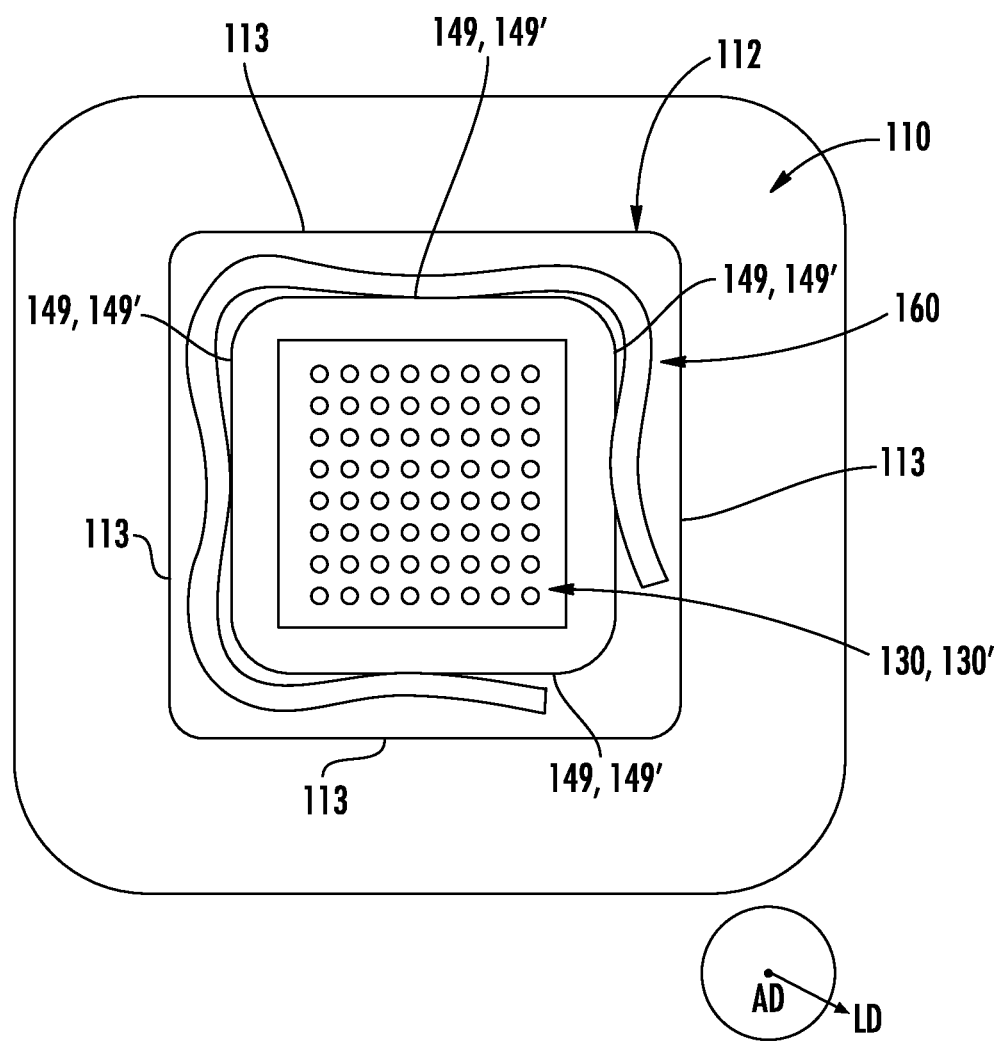
FIG. 10 schematically depicts another cross-section of the ferrule of FIG. 8 positioned within an annular guide tube, according to one or more embodiments shown and described herein.

Referring collectively to FIGS. 8, 9, and 10, a perspective view and section views of other ferrules 130, 130' positioned within an annular guide tube 110 are schematically depicted, respectively. In the embodiment depicted in FIGS. 8, 9, and 10, the outer surface 148, 148' of the ferrules 130, 130' include planar surfaces 149, 149'. In particular, in the embodiment depicted in FIGS. 8, 9, and 10, the ferrules 130, 130' include four planar surfaces 149, 149' such that the ferrules 130, 130' generally define a rectangular cross-section. The ferrules 130, 130' may include the ferrule keying portion 152, 152', which may angularly align the ferrules 130, 130' with the a corresponding keying feature of the annular guide tube 110, similar to the embodiments described above with respect to FIGS. 1-7.

Referring particularly to FIG. 9, the inner perimeter 112 of the annular guide tube 110 defines planar surfaces 113. In the embodiment, depicted in FIG. 9, the inner perimeter 112 of the annular guide tube 110 defines four planar surfaces 113, such that the inner perimeter 112 generally defines a rectangular cross-section. In the embodiment depicted in FIG. 9, a pair of biasing members 183 may be positioned within the inner perimeter 112 of the annular guide tube 110 to bias the ferrules 130, 130' against adjacent planar surfaces 113 of the annular guide tube 110. By biasing the ferrules 130, 130' against adjacent planar surfaces 113 of the annular guide tube 110, the annular guide tube 110 itself, rather than the ferrule sleeve 160 as depicted in FIG. 4 and described above, may align the ferrules 130, 130' in the lateral direction.

Referring to FIG. 10, in another embodiment, a rectangular-shaped ferrule sleeve 160 may align and restrain the ferrules 130, 130' in the lateral direction.

Accordingly, fiber optic junctions according to the present disclosure generally include ferrules having a ferrule keying portion that rotationally aligns and constrains the ferrules with a guide keying portion of an annular guide tube. The ferrules are further aligned and constrained and aligned in a lateral direction with a ferrule sleeve. Methods for forming the ferrules and the fiber optic junction are described below.

Referring to FIG. 11, an exploded view of a plurality of optical fibers 180, 180' is schematically depicted. The plurality of optical fibers 180, 180' generally include fiber ribbons 182, 182' that include a plurality of coated optical fibers 184, 184'. At an end of the plurality of optical fibers 180, 180', the coating of the coated optical fibers 184, 184' may be removed, leaving bare optical fibers 186, 186' (e.g., the core and cladding of the optical fibers). Initially, the bare optical fibers 186, 186' are inserted into a fiber array substrate 136, 136' including a plurality of fiber alignment holes 138, 138'.

The fiber alignment holes 138, 138' in the respective fiber array substrate 136,136' may be formed by any suitable process for the material used. For example, if the fiber array substrate 136, 136' is a polymer such as an injection molded plastic component, then the fiber alignment holes 138, 138' may be formed using precision tooling such as molding pins in the injection molding process. Alternatively if the fiber array substrate 136, 136' is a glass or other suitable substrate, the fiber alignment holes 138, 138' may be formed using precision laser hole drilling processes. Other processes may be possible for the fiber alignment holes as well.

Figure 12:
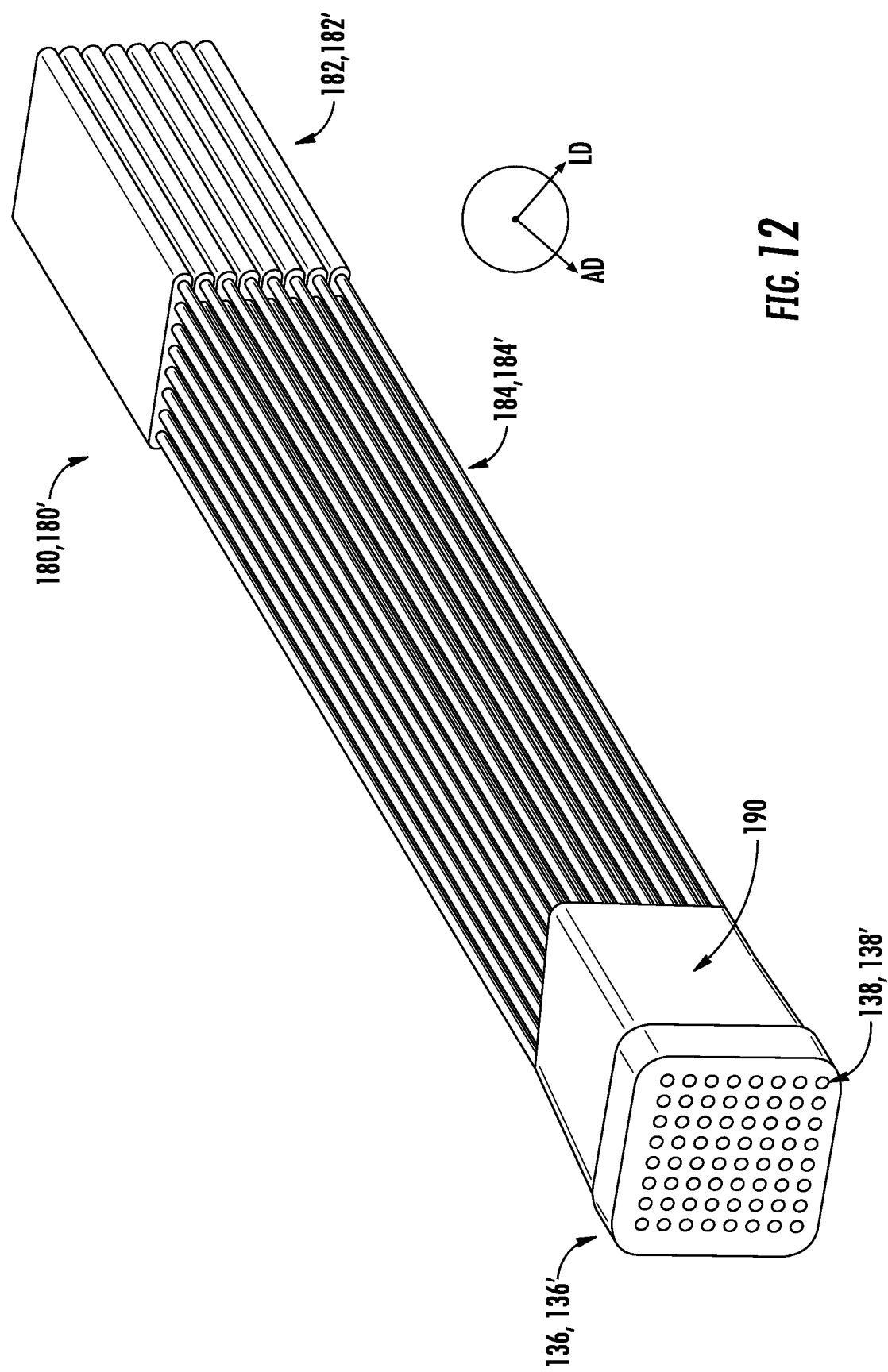
FIG. 12 schematically depicts the plurality of optical fibers of FIG. 11 coupled to the fiber array substrate, according to one or more embodiments shown and described herein.

Referring to FIG. 12, an adhesive 190 is then applied to the bare optical fibers 186, 186' to couple the plurality of optical fibers 180, 180' to the fiber array substrate 136, 136'.

Figure 13:
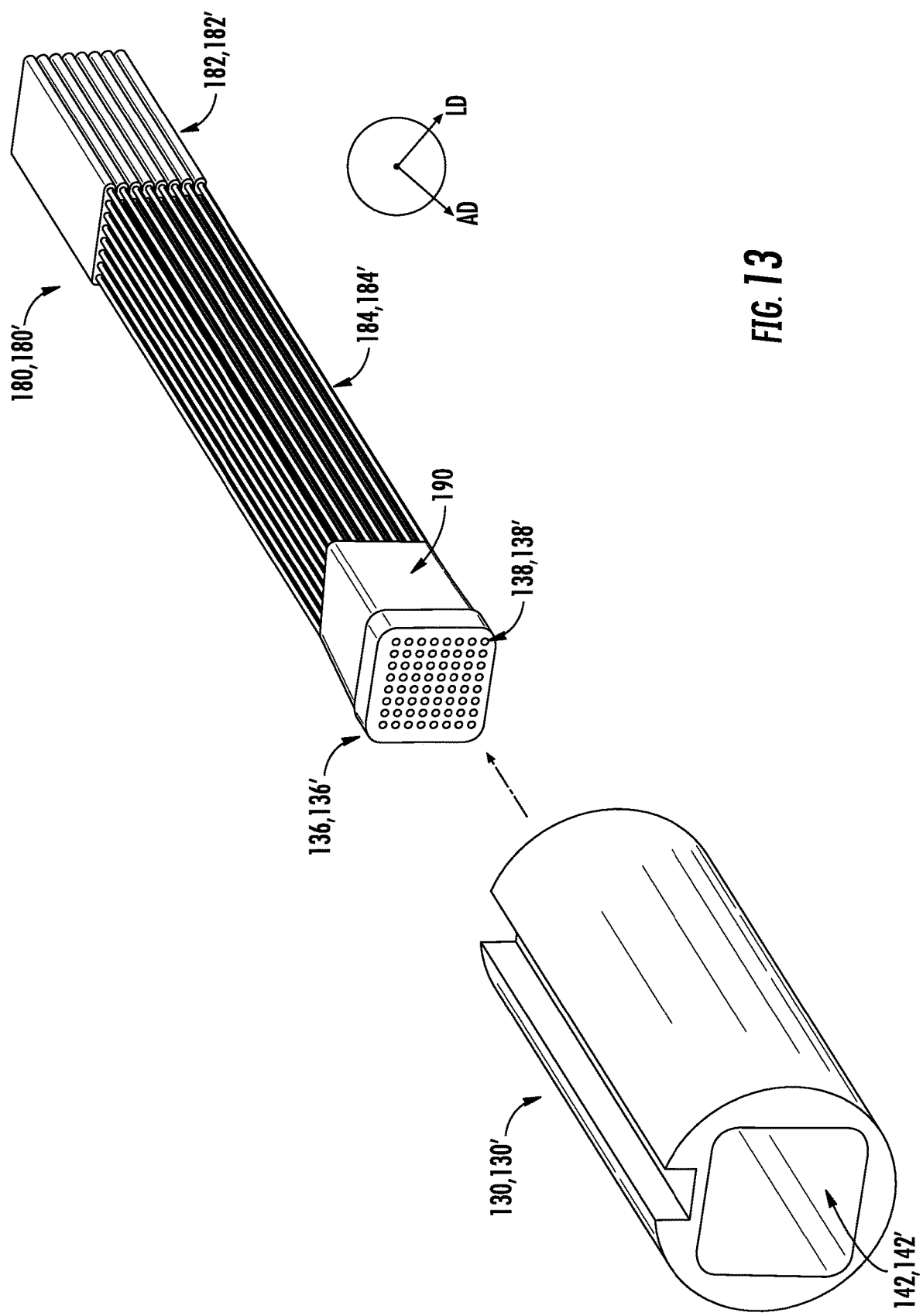
FIG. 13 schematically depicts the plurality of optical fibers and the fiber array substrate of FIG. 12 being inserted into the ferrule of FIG. 2, according to one or more embodiments shown and described herein.

Referring next to FIG. 13, the fiber array substrate 136, 136' and the plurality of optical fibers 180, 180' are then inserted into the guide cavity 142, 142' of the ferrules 130, 130'. In some embodiments, the fiber array substrate 136, 136' serves as the front face 134 (FIG. 2) of the ferrules 130, 130'. In other embodiments, the ferrules 130, 130' include a separate front face 134 (FIG. 2) and the fiber array substrate 136, 136' is positioned rearward of the front face 134 (FIG. 2). The connector designs may be advantageous since it allows the connector structure to be modular and support different fiber counts by using different fiber array substrates and/or lenses to adapt to different fiber counts for the connectors and using the same ferrules. For instance, the connector may merely change out the fiber array substrates and/or lenses for a different fiber count or alternatively only populate a select number of fiber passageways with optical fibers within the connector.

Figure 14:
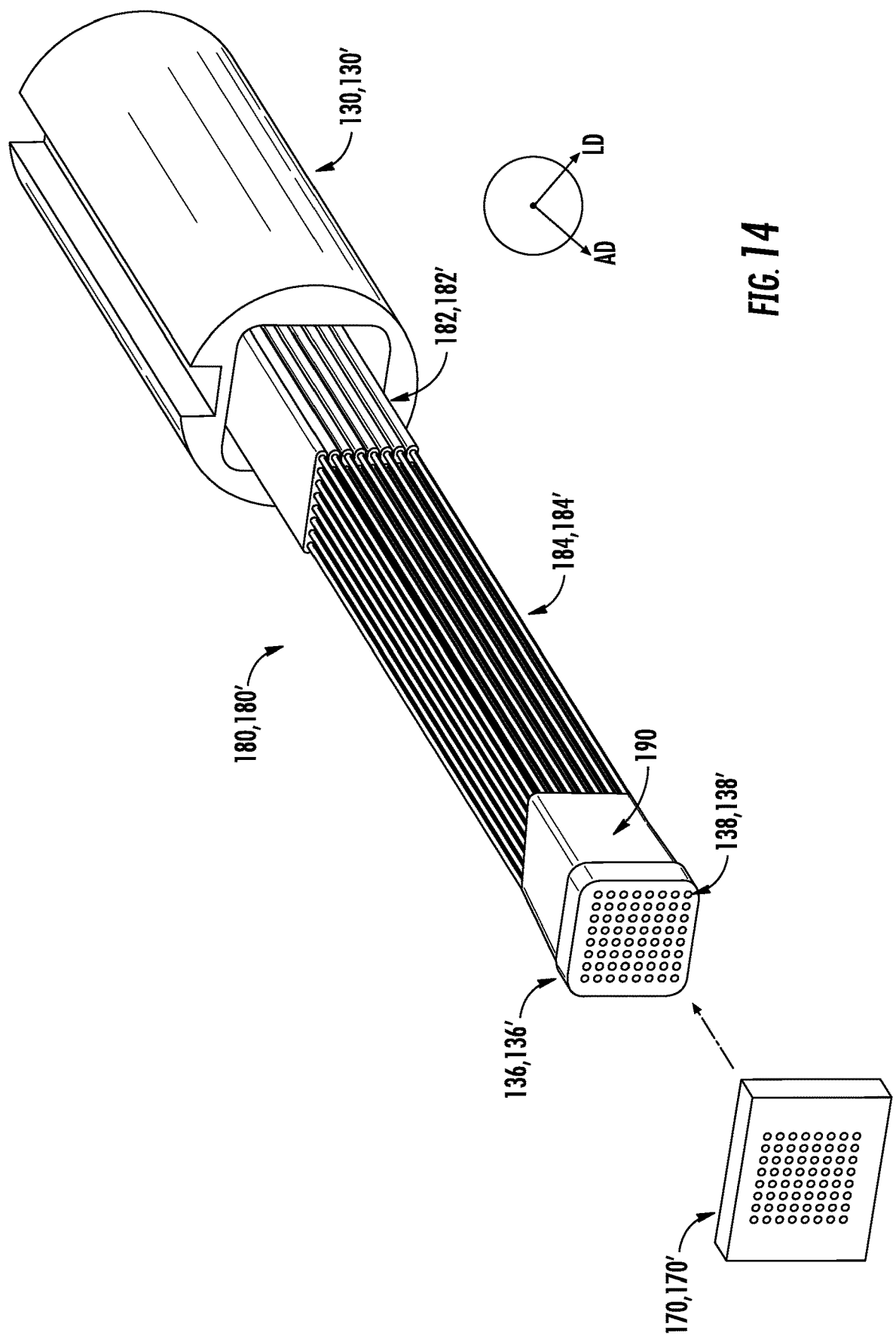
FIG. 14 schematically depicts a lens array being positioned on the fiber array substrate of FIG. 14, according to one or more embodiments shown and described herein.
Figure 15:
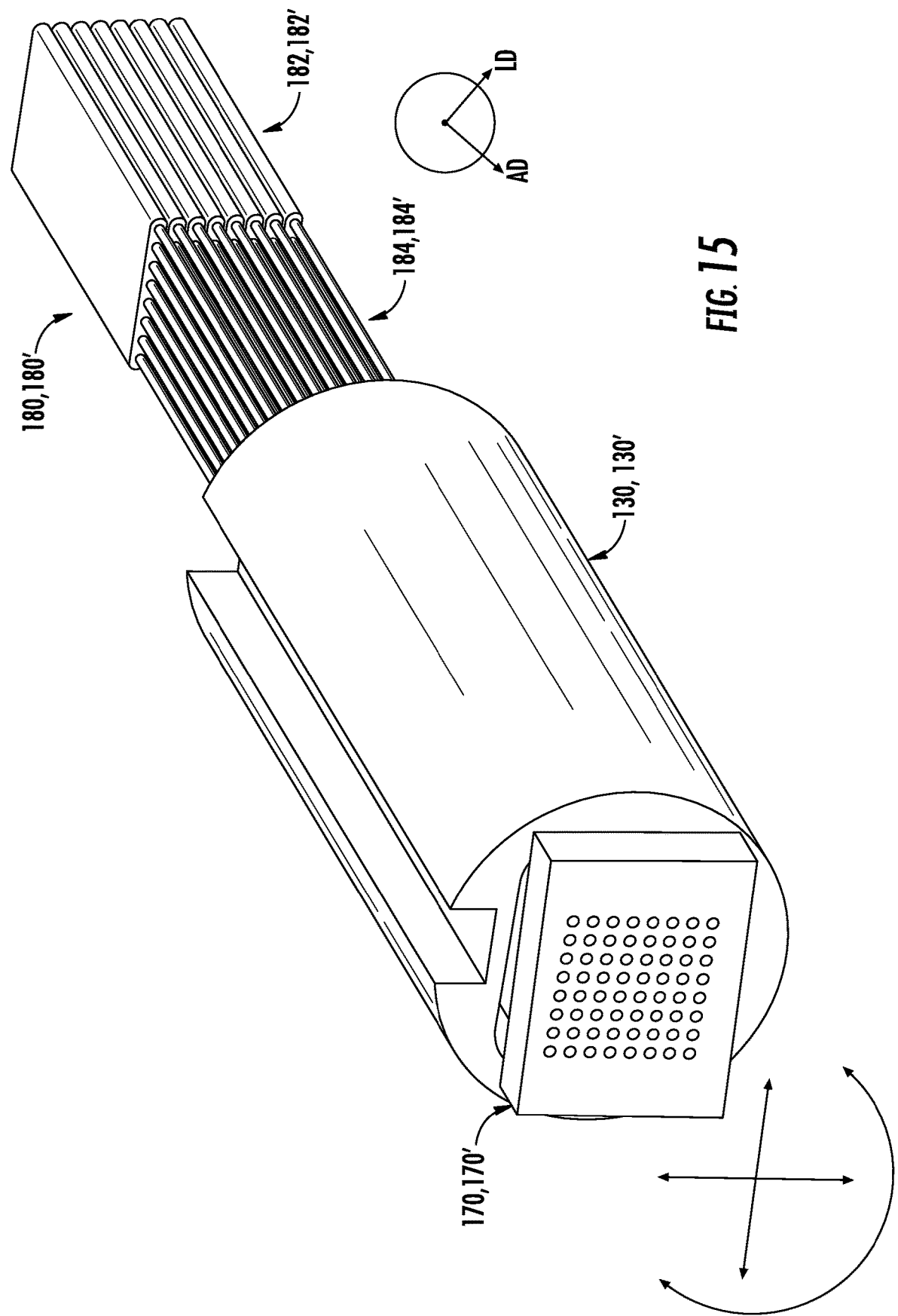
FIG. 15 schematically depicts the lens array of FIG. 14 coupled to the fiber array substrate and the ferrule, according to one or more embodiments shown and described herein.

Referring collectively to FIGS. 14 and 15, the lens array 170, 170' is then coupled to the ferrule 130, 130' and/or to the fiber array substrate 136, 136' to optically couple the lens array 170, 170' to the plurality of optical fibers 180, 180'. An active alignment process may be used for laterally and rotationally aligning the lens array 170, 170' to the ferrule 130, 130' and/or to the fiber array substrate 136, 136' optical fibers 180, 180'. Additionally, the lens array 170, 170' may be attached using a suitable adhesive. In other embodiments, the lens array 170,170' may have respective fiber lead-in or divots aligned with the respective lenses for aligning the optical fibers 180,180' with the individual lenses. The lens array 170,170' may be attached using a UV curable adhesive that is cured via UV exposure through the lens array 170, 170', but other methods are possible. Although the embodiment depicted in FIGS. 14 and 16 shows the lens array 170, 170' having a rectangular shape, the lens array 170, 170' may include any suitable shape, such as the circular shape depicted in FIG. 17.

Furthermore, the material of the lens array 170,170' may have one or more material characteristics that are matched to fiber array substrate 136,136' to preserve the optical performance. For instance, the lens array 170, 170' may be fabricated from a first material with a first coefficient of thermal expansion (CTE) and the fiber array substrate 136, 136' may be fabricated from a second material with a second CTE that is matched to within 2 ppm/° C. or less for preserving optical performance across a given temperature range (e.g., 0° Celsius to 40° Celsius). For instance, the lens array 170,170' may be fabricated from a glass material having a CTE in the range of 3-7 ppm/° C., and the CTE of the material for the fiber array substrate 136, 136' may be matched to the lens array CTE to within 1 ppm/° C. or less. As an example, the fiber array substrate 136, 136' may be another glass material or suitable polymer such as a high-fill polymer having the desired material characteristics. This CTE matching between components ensures that thermally-induced expansion of the lens array 170, 170' does not introduce excess lateral misalignments with optical fibers 180, 180' held in the fiber array substrate 136, 136' during temperature variations that could severely impact optical performance. As the size of the lens array 170, 170' increases (due to coupling of larger numbers of optical fibers 180, 180'), the need to match the CTE of the lens array 170, 170' with the fiber array substrate 136, 136' becomes more of a concern due to thermal expansion or contraction of components across the optical array. The lens array may be positioned at an end face of the fiber array substrate or seated within a recess at the end face of fiber array substrate as desired.

In a similar manner, the lens array 170, 170' of the connector shown in FIG. 1 may be fabricated from a first material with a first coefficient of thermal expansion (CTE) and the ferrule 130,130' may be fabricated from a second material with a second CTE that is matched to within 2 ppm/° C. or less for preserving optical performance across a given temperature range (e.g., 0° Celsius to 40° Celsius). For instance, the lens array 170,170' may be fabricated from a glass material having a CTE in the range of 3-7 ppm/° C., and the CTE of the material for the ferrule 130, 130' may be matched to the lens array CTE to within 1 ppm/° C. or less. As an example, the ferrule 130, 130' may be another glass material or suitable polymer such as a high-fill polymer having the desired material characteristics. This CTE matching between components ensures that thermally-induced expansion of the lens array 170, 170' does not introduce excess lateral misalignments with optical fibers 180, 180' held in the ferrule 130, 130' during temperature variations that could severely impact optical performance. As the size of the lens array 170, 170' increases (due to coupling of larger numbers of optical fibers 180, 180'), the need to match the CTE of the lens array 170, 170' with the ferrule 130, 130' becomes more of a concern due to thermal expansion or contraction of components across the optical array. The lens array may be positioned at an end face of the ferrule or seated within a recess at the end face of ferrule as desired.

Figure 16:
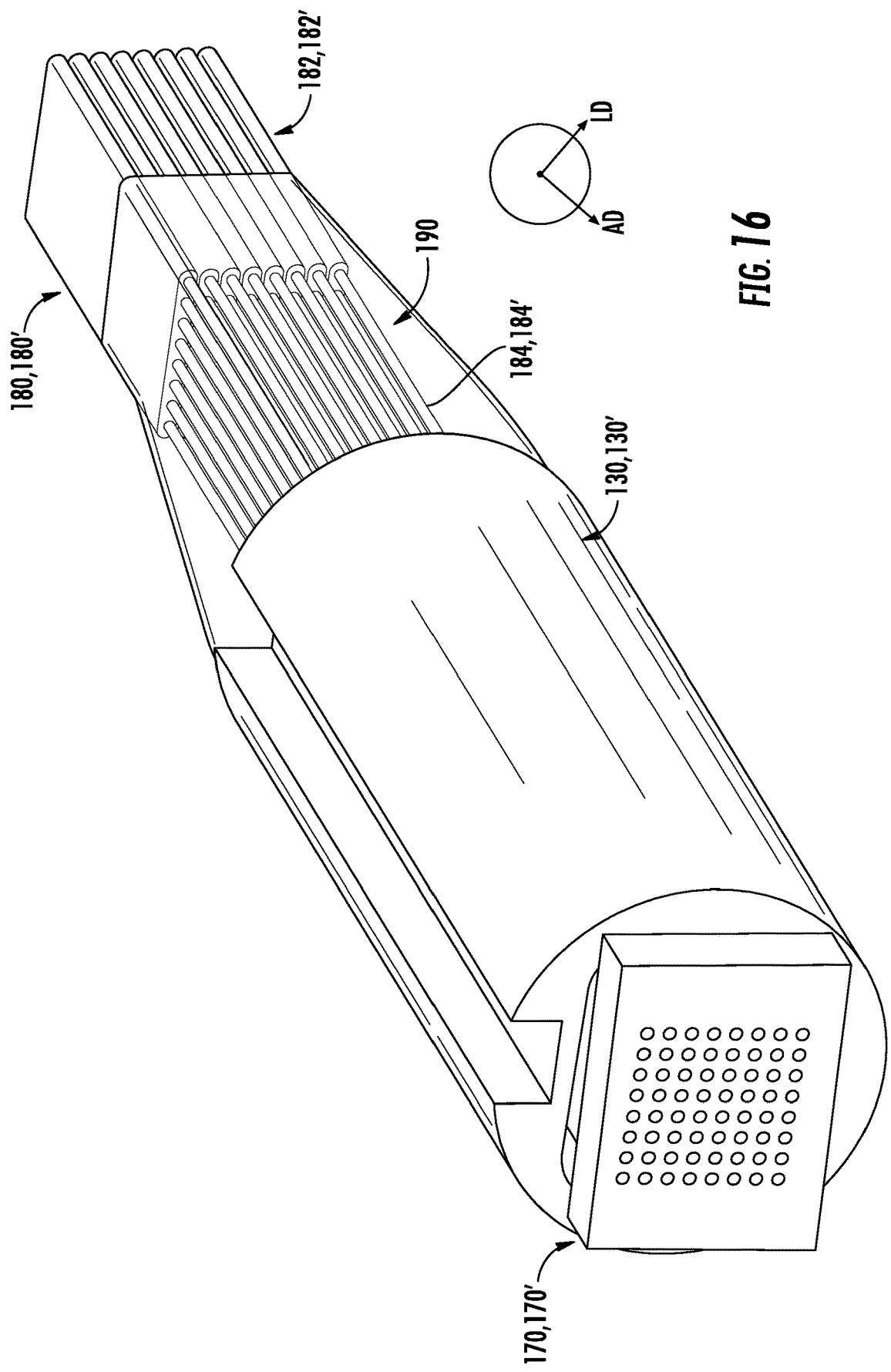
FIG. 16 schematically depicts the lens array of coupled to the fiber array substrate and the ferrule of FIG. 15, according to one or more embodiments shown and described herein.
Figure 17:
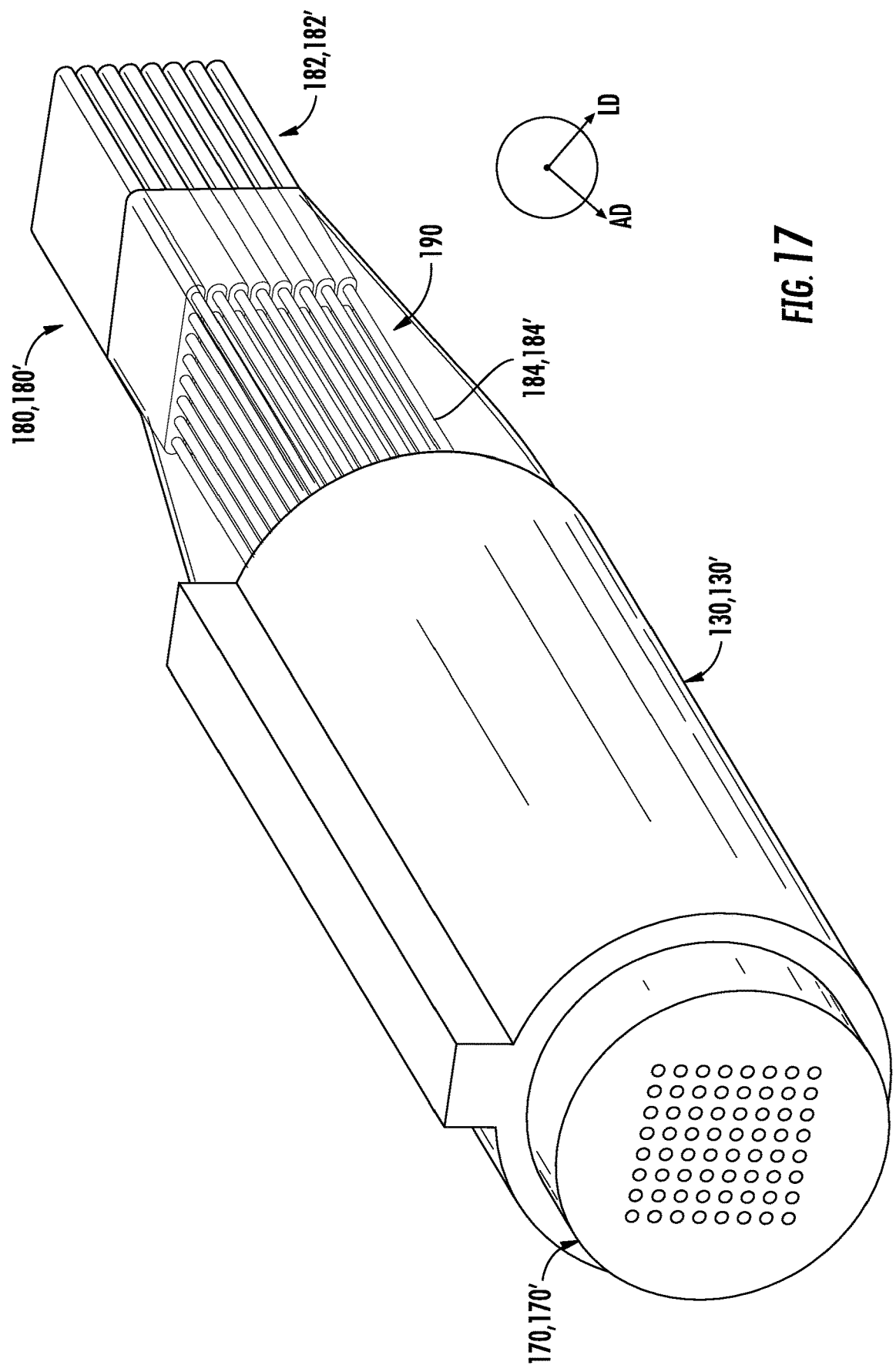
FIG. 17 schematically depicts another lens array coupled to the fiber array substrate and the ferrule of FIG. 15, according to one or more embodiments shown and described herein.

Referring collectively to FIGS. 16 and 17, with the lens array 170, 170' coupled to the ferrule 130, 130' and/or the fiber array substrate 136, 136', an adhesive 190 is applied to the ferrule 130, 130' to couple the coated plurality of fibers 184, 184' to the ferrule 130, 130'. In embodiments, the adhesive 190 is applied to the plurality of optical fibers 180, 180' extending rearward to the fiber ribbon 182, 182'. The adhesive 190 may include elastic properties when cured to assist in isolating any force applied to the fiber ribbon 182, 182' in the axial direction from reaching the bare fibers 186, 186' (FIG. 11).

Figure 18:
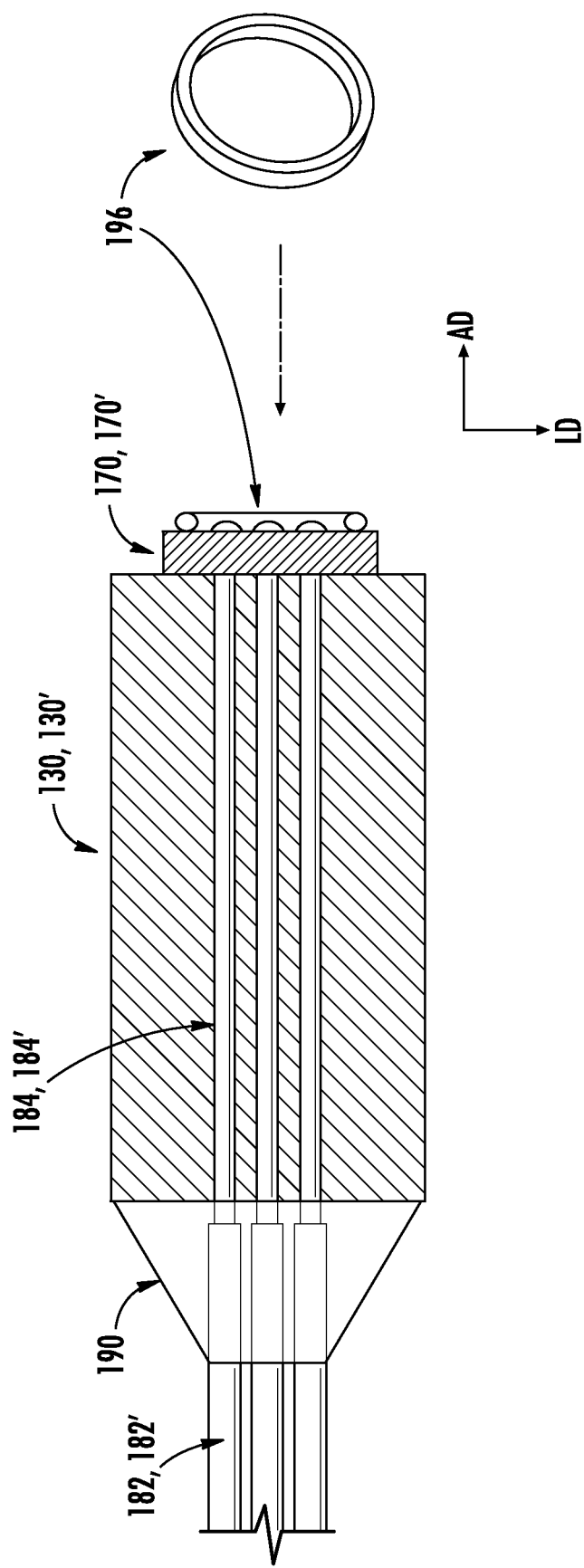
FIG. 18 schematically depicts cross-section of the ferrule of FIG. 17, according to one or more embodiments shown and described herein.
Figure 19:
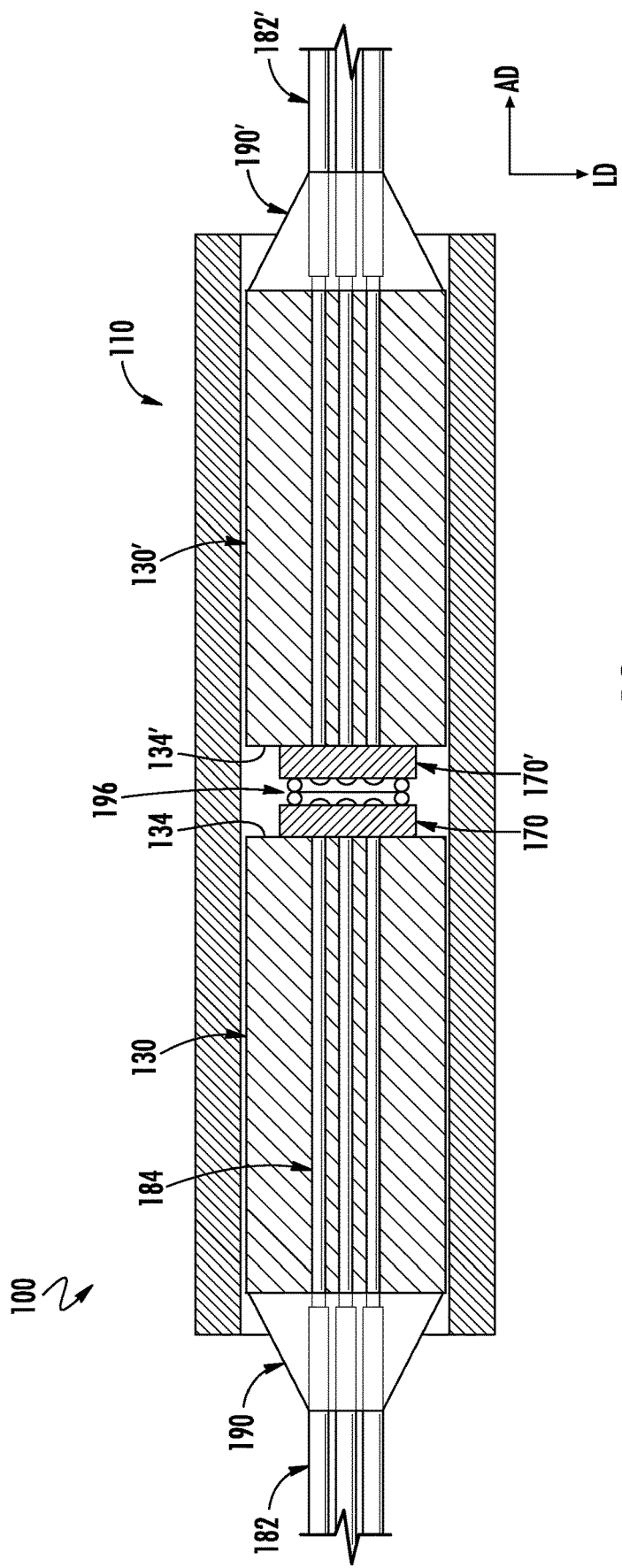
FIG. 19 schematically depicts a cross-section of the fiber optic junction of FIG. 1 along section 19-19, according to one or more embodiments shown and described herein.

Referring to FIGS. 18 and 19, a cross-section of the ferrule 130, 130' of FIG. 17, and a cross-section of the fiber optic junction 100 along section 19-19 of FIG. 1 are schematically depicted, respectively. In embodiments a sealing element 196 is coupled to one of both of the lens arrays 170, 170' and/or the front faces 134, 134' of the first ferrule 130 and the second ferrule 130'. The sealing element 196 may generally include any material suitable for forming a seal around the lens arrays 170, 170' and/or the front faces 134, 134', such as an elastic o-ring or the like.

Accordingly, it should now be understood that multifiber connectors and fiber optic junctions according to the present disclosure include ferrules having a ferrule keying portion that rotationally aligns and constrains the ferrules with a guide keying portion of an annular guide tube. The ferrules are further aligned and constrained in a lateral direction with a ferrule sleeve. Each of the ferrule sleeve and the guide keying portion individually constrain movement of the ferrules in a single dimension. By each individually restricting movement of the ferrules in single and in separate dimensions, the ferrule sleeve and the guide keying portion may restrain the ferrules as desired, without mechanically over-constraining the ferrules. Furthermore as the ferrules are aligned and constrained using a common ferrule sleeve and common guide keying portion, the components used to optically couple the ferrules may be minimized, thereby reducing tolerance stack-ups and improving alignment between the ferrules.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed:

1. A fiber optic junction connecting a first plurality of optical fibers to a second plurality of optical fibers, the fiber optic junction comprising:
    an annular guide tube extending in an axial direction, the annular guide tube defining an inner perimeter and a central axis extending through the annular guide tube in the axial direction;
    a guide keying portion positioned on the inner perimeter of the annular guide tube, the guide keying portion comprising at least one ferrule engagement surface extending in a plane that is aligned with the central axis of the annular guide tube;
    a ferrule positioned at least partially within the annular guide tube and extending between a front end and a rear end positioned opposite the front end, the ferrule defining:
        a front face that extends in a plane that is transverse to the axial direction and a plurality of fiber alignment holes extending in the axial direction through the front face;
        an outer surface extending around the ferrule, the outer surface defining a nominal portion; and
        a ferrule keying portion defined on the outer surface of the ferrule, wherein the nominal portion is interrupted by the ferrule keying portion and the ferrule keying portion comprises at least one keying portion contact surface that extends in a plane that is aligned with the axial direction and the at least one keying portion contact surface is engaged with the at least one ferrule engagement surface of the guide keying portion such that the ferrule is fixed with respect to the annular guide tube about the central axis of the annular guide tube; and
    a ferrule sleeve positioned between the inner perimeter of the annular guide tube and the outer surface of the ferrule, the ferrule sleeve extending around and engaging at least a portion of the outer surface of the ferrule, wherein the ferrule sleeve has a c-shape comprising an opening that leaves the ferrule keying portion and the guide keying portion uncovered by the ferrule sleeve.

2. The fiber optic junction of claim 1, further comprising a lens array coupled to the front face of the ferrule, the lens array comprising a plurality of lenses that each correspond to ones of the plurality of fiber alignment holes of the ferrule.

3. The fiber optic junction of claim 1, wherein the ferrule further defines a guide cavity extending into the rear end of the ferrule in the axial direction, the guide cavity comprising a guide cavity height and a guide cavity width.

4. The fiber optic junction of claim 3, wherein the guide cavity extends into the rear end of the ferrule in the axial direction a distance that is greater than the guide cavity height and the guide cavity width.

5. The fiber optic junction of claim 1, wherein the ferrule comprises a length evaluated in the axial direction that is at least twice a diameter or major dimension of the ferrule.

6. The fiber optic junction of claim 1, wherein the outer surface of the ferrule comprises a curved surface at the nominal portion.

7. The fiber optic junction of claim 1, wherein the ferrule keying portion extends outward from the outer surface of the ferrule.

8. The fiber optic junction of claim 1, wherein the ferrule keying portion extends inward from the outer surface of the ferrule.

9. A fiber optic junction comprising:
    an annular guide tube extending in an axial direction, the annular guide tube defining an inner perimeter and a central axis extending through the annular guide tube in the axial direction;
    a guide keying portion positioned on the inner perimeter of the annular guide tube, the guide keying portion comprising at least one ferrule engagement surface extending in a plane that is aligned with the central axis of the annular guide tube;
    a ferrule sleeve positioned within the inner perimeter of the annular guide tube;
    a first ferrule positioned at least partially within the annular guide tube and extending between a front end and a rear end positioned opposite the front end, the first ferrule defining:
        an outer surface extending around the first ferrule, the outer surface defining a nominal portion;
        a ferrule keying portion defined on the outer surface of the first ferrule, wherein the nominal portion is interrupted by the ferrule keying portion and the ferrule keying portion comprises at least one keying portion contact surface that extends in a plane that is aligned with the axial direction and the at least one keying portion contact surface is engaged with the at least one ferrule engagement surface of the guide keying portion such that the first ferrule is fixed with respect to the annular guide tube about the central axis of the annular guide tube;
a front face that extends in a plane that is transverse to the axial direction and a plurality of fiber alignment holes extending in the axial direction through the front face;
a first plurality of optical fibers extending at least partially through the plurality of fiber alignment holes of the first ferrule;
a second ferrule positioned at least partially within the annular guide tube and extending between a front end and a rear end positioned opposite the front end, the second ferrule defining:
an outer surface extending around the second ferrule, the outer surface defining a nominal portion;
a ferrule keying portion defined on the outer surface of the second ferrule, wherein the nominal portion is interrupted by the ferrule keying portion and the ferrule keying portion comprises at least one keying portion contact surface that extends in a plane that is aligned with the axial direction and the at least one keying portion contact surface is engaged with the at least one ferrule engagement surface of the guide keying portion such that the second ferrule is fixed with respect to the annular guide tube about the central axis of the annular guide tube;
a front face that extends in a plane that is transverse to the axial direction and a plurality of fiber alignment holes extending in the axial direction through the front face;
a second plurality of optical fibers extending at least partially through the plurality of fiber alignment holes of the second ferrule, wherein the second plurality of optical fibers are optically coupled to the first plurality of optical fibers,
wherein the ferrule sleeve has a c-shape comprising an opening that leaves the ferrule keying portion and the guide keying portion of the first ferrule and the second ferrule uncovered by the ferrule sleeve.

10. The fiber optic junction of claim 9, further comprising a first lens array coupled to the front face of the first ferrule, the first lens array comprising a plurality of lenses that each correspond to ones of the plurality of fiber alignment holes of the first ferrule.

11. The fiber optic junction of claim 9, wherein the first ferrule further defines a guide cavity extending into the rear end of the first ferrule in the axial direction, the guide cavity comprising a guide cavity height and a guide cavity width.

12. The fiber optic junction of claim 11, wherein the guide cavity extends into the rear end of the first ferrule in the axial direction a distance that is greater than the guide cavity height and the guide cavity width.

13. The fiber optic junction of claim 9, wherein the first ferrule comprises a length evaluated in the axial direction that is at least twice a diameter or major dimension of the first ferrule evaluated around the outer surface of the first ferrule.

14. The fiber optic junction of claim 9, wherein the outer surface of the first ferrule comprises a curved surface at the nominal portion.

15. The fiber optic junction of claim 9, further comprising a sealing element positioned between and engaged with the front face of the first ferrule and the front face of the second ferrule.

16. The fiber optic junction of claim 9, wherein the ferrule keying portion extends outward from the outer surface of the first ferrule.

17. The fiber optic junction of claim 9, wherein the ferrule keying portion extends inward from the outer surface of the first ferrule.

18. A method for forming a fiber optic junction, the method comprising:
inserting a plurality of optical fibers into a plurality of fiber alignment holes of a fiber array substrate;
applying an adhesive to the plurality of optical fibers to couple the plurality of optical fibers to the fiber array substrate;
inserting the plurality of optical fibers and the fiber array substrate into a guide cavity defined by a ferrule, the ferrule further defining the ferrule defining an outer surface extending around the ferrule, the outer surface defining a nominal portion and a ferrule keying portion defined on the outer surface of the ferrule, wherein the nominal portion is interrupted by the ferrule keying portion;
coupling the plurality of optical fibers and the fiber array substrate to the ferrule;
inserting the ferrule within a ferrule sleeve, wherein the ferrule sleeve has a c-shape comprising an opening that leaves the ferrule keying portion ferrule uncovered by the ferrule sleeve;
inserting the ferrule and the ferrule sleeve into an annular guide tube extending in an axial direction, the annular guide tube defining an inner perimeter and a central axis extending through the annular guide tube in the axial direction; and
engaging the ferrule keying portion with a guide keying portion positioned on the inner perimeter of the annular guide tube.

19. The method of claim 18, wherein engaging the ferrule keying portion with the guide keying portion comprises engaging at least one keying portion contact surface of the ferrule keying portion that extends in a plane that is aligned with the axial direction with at least one ferrule engagement surface of the guide keying portion extending in a plane that is aligned with the central axis of the annular guide tube.

20. The method of claim 18, further comprising coupling a lens array to a front face of the ferrule, the lens array comprising a plurality of lenses that each correspond to ones of the plurality of fiber alignment holes of the fiber array substrate.

21. The method of claim 18, wherein the plurality of optical fibers are a first plurality of optical fibers and further comprising optically coupling the first plurality of optical fibers to a second plurality of optical fibers positioned within a second ferrule.

22. The method of claim 21, further comprising:
inserting the second ferrule into the annular guide tube; and
engaging a second ferrule keying portion of the second ferrule with the guide keying portion positioned on the inner perimeter of the annular guide tube.

23. The method of claim 22, wherein engaging the second ferrule keying portion with the guide keying portion comprises engaging at least one second keying portion contact surface of the second ferrule keying portion that extends in a plane that is aligned with the axial direction with at least one ferrule engagement surface of the guide keying portion extending in a plane that is aligned with the central axis of the annular guide tube.

24. A fiber optic connector comprising:
a ferrule extending between a front end and a rear end positioned opposite the front end, the ferrule defining:
a guide cavity;
an outer surface extending around the ferrule, the outer surface defining a nominal portion; and
a ferrule keying portion defined on the outer surface of the ferrule, wherein the nominal portion is interrupted by the ferrule keying portion and the ferrule keying portion comprises at least one keying portion contact surface that extends in a plane that is aligned with an axial direction of the ferrule;
a ferrule sleeve disposed around the ferrule, wherein the ferrule sleeve has a c-shape comprising an opening that leaves the ferrule keying portion ferrule uncovered by the ferrule sleeve;
a fiber array substrate comprising a plurality of fiber alignment holes that extend to a front face of the fiber array substrate, wherein a portion of the fiber array substrate is disposed within the guide cavity of the ferrule; and
a lens array, wherein the lens array comprises a plurality of fiber lead-ins aligned with a plurality of lenses.

25. The fiber optic connector of claim 24, wherein lens array comprises a first material having a first coefficient of thermal expansion (CTE) and the fiber array substrate comprises a second material having second coefficient of thermal expansion (CTE), wherein the first CTE is matched to the second CTE to within 2 ppm/° C. from 0° Celsius to 40° Celsius.

26. The fiber optic connector of claim 25, wherein the first material comprises a glass.

27. The fiber optic connector of claim 26, wherein the first material comprises a first CTE in the range of 3-7 ppm/° Celsius.

28. The fiber optic connector of claim 24, wherein the lens array comprises a rectangular shape.

29. The fiber optic connector of claim 24, further comprising a plurality of optical fibers extending into the plurality of fiber alignment holes of the fiber array substrate and being aligned with the plurality of fiber lead-ins of the lens array.

30. A fiber optic connector comprising:
a ferrule extending between a front end and a rear end positioned opposite the front end, the ferrule defining:
a plurality of fiber alignment holes that extend to a front end of the ferrule;
an outer surface extending around the ferrule, the outer surface defining a nominal portion; and
a ferrule keying portion defined on the outer surface of the ferrule, wherein the nominal portion is interrupted by the ferrule keying portion and the ferrule keying portion comprises at least one keying portion contact surface that extends in a plane that is aligned with an axial direction of the ferrule;
a ferrule sleeve disposed around the ferrule, wherein the ferrule sleeve has a c-shape comprising an opening that leaves the ferrule keying portion ferrule uncovered by the ferrule sleeve; and
a lens array, wherein the lens array comprises a plurality of fiber lead-ins aligned with a plurality of lenses, wherein lens array comprises a first material having a first coefficient of thermal expansion (CTE) and the ferrule comprises a second material having second coefficient of thermal expansion (CTE), wherein the first CTE is matched to the second CTE to within 2 ppm/° C. from 0° Celsius to 40° Celsius.

31. The fiber optic connector of claim 30, wherein the first material comprises a glass.

32. The fiber optic connector of claim 31, wherein the first material comprises a first CTE in the range of 3-7 ppm/° Celsius.

33. The fiber optic connector of claim 30, wherein the lens array comprises a rectangular shape.

34. The fiber optic connector of claim 30, further comprising a plurality of optical fibers extending into the plurality of fiber alignment holes of the ferrule and being aligned with the plurality of fiber lead-ins of the lens array.

* * * * *